(12) United States Patent
Shioiri et al.

(10) Patent No.: US 8,931,596 B2
(45) Date of Patent: Jan. 13, 2015

(54) LUBRICANT OIL SUPPLYING APPARATUS

(75) Inventors: Hiroyuki Shioiri, Numazu (JP); Tadashi Yamada, Toyota (JP); Haruo Isomura, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 802 days.

(21) Appl. No.: 13/061,273

(22) PCT Filed: Feb. 4, 2010

(86) PCT No.: PCT/JP2010/051638
§ 371 (c)(1),
(2), (4) Date: Feb. 28, 2011

(87) PCT Pub. No.: WO2011/096065
PCT Pub. Date: Aug. 11, 2011

(65) Prior Publication Data
US 2011/0192245 A1 Aug. 11, 2011

(51) Int. Cl.
*F16H 57/04* (2010.01)
(52) U.S. Cl.
CPC ........ *F16H 57/0423* (2013.01); *F16H 57/0483* (2013.01); *F16H 57/0495* (2013.01)
USPC ...................................................... 184/6.12
(58) Field of Classification Search
USPC ...................................................... 184/6.12
See application file for complete search history.

(56) References Cited

U.S. PATENT DOCUMENTS 4,612,818 A * 9/1986 Hori et al. ........................ 74/467
4,630,711 A * 12/1986 Levrai et al. ................. 184/6.12
(Continued)

FOREIGN PATENT DOCUMENTS

JP 2 121659 10/1990
JP 6 80050 11/1994
(Continued)

OTHER PUBLICATIONS

International Search Report issued Apr. 6, 2010 in PCT/JP10/51638 filed Feb. 4, 2010.

*Primary Examiner* — William E Dondero
*Assistant Examiner* — Mark K Buse
(74) *Attorney, Agent, or Firm* — Oblon, Spivak, McClelland, Maier & Neustadt, L.L.P.

(57) ABSTRACT

A lubricant oil supplying apparatus (1-1) provided for a power transmission apparatus (1) having an accumulating part (9), a rotating member (7) rotating interlockingly with rotation of a drive wheel to feed a lubricant oil in the accumulating part, and an oil receiving part (8) disposed above in the vertical direction than the rotating member, and supplying the lubricant oil to the oil receiving part, in which a passage member (10) for guiding the lubricant oil fed by the rotating member to the oil receiving part is provided. The passage member has: a first component part (11) provided so as to be opposed to the rotating member along a circumferential direction and forming, between the rotating member and itself, a first passage (13) to which the lubricating oil flows; and a second component part (12) forming a second passage (14) for guiding the lubricant oil in the first passage to the oil receiving part, and the second passage is connected to the first passage on the upstream side in the flow direction of an outflow port (13b). The lubricant oil supplying apparatus further includes a suppression structure (7, 10) of suppressing flow of the lubricant oil in the first passage from a connection part (13c) to the second passage toward the outflow port.

19 Claims, 35 Drawing Sheets

(56) References Cited

U.S. PATENT DOCUMENTS

| | | | | |
|---|---|---|---|---|
| 4,721,184 | A | * | 1/1988 | Sowards ..................... 184/6.12 |
| 4,879,921 | A | * | 11/1989 | Asada et al. .................... 74/467 |
| 6,634,459 | B1 | * | 10/2003 | Litkenhus et al. ........... 184/6.12 |
| 7,984,791 | B2 | * | 7/2011 | Taguchi et al. .............. 184/6.12 |

FOREIGN PATENT DOCUMENTS

| | | |
|---|---|---|
| JP | 2000 274518 | 10/2000 |
| JP | 2003 336729 | 11/2003 |
| JP | 2005 308044 | 11/2005 |
| JP | 2009 209980 | 9/2009 |

* cited by examiner

LUBRICANT OIL SUPPLYING APPARATUS

FIELD

The present invention relates to a lubricant oil supplying apparatus.

BACKGROUND

Conventionally, there is known a technique of feeding a lubricant oil to an oil receiving part on the upper side in the vertical direction by rotation of a rotating member which rotates interlockingly with rotation of a drive wheel in a power transmission apparatus. For example, Patent Literature 1 discloses a technique that an oil supply apparatus for supplying oil fed up by a rotating member to an oil receiving part is provided with a branch mechanism of branching the movement direction of the fed oil to different directions in accordance with rotational speed of the rotating member.

CITED LIST

Patent Literature

Patent Literature 1: Japanese Patent Application Laid-open No. 2003-336729

SUMMARY

Technical Problem

However, in the case of feeding the lubricant oil upward by the rotation of the rotating member, the lubricant oil may not reach the oil receiving part in the case such that when the vehicle speed is low or the height from the rotating member to the oil receiving part is large. When an oil pump is added or enhanced to address the situation, problems such as increase in cost and increase in drag torque occur.

An object of the present invention is to provide a lubricant oil supplying apparatus capable of achieving improvement in performance of feeding a lubricant oil to the upper side in the vertical direction.

Solution to Problem

A lubricant oil supplying apparatus of the present invention provided for a power transmission apparatus having an accumulating part for accumulating lubricant oil, a rotating member connected to a drive wheel of a vehicle and feeding the lubricant oil in the accumulating part by rotating interlockingly with rotation of the drive wheel, and an oil receiving part disposed above the rotating member in the vertical direction, in which the lubricant oil is supplied from the oil receiving part to a part to be lubricated, and supplying the lubricant oil to the oil receiving part, the lubricant oil supplying apparatus includes a passage member that guides the lubricant oil fed by the rotating member to the oil receiving part, wherein the passage member includes a first component part that is provided so as to be opposed to the rotating member along a circumferential direction of the rotating member and forms, between the rotating member and itself, a first passage in which the lubricating oil fed by the rotating member flows, and a second component part that forms a second passage for guiding the lubricant oil in the first passage to the oil receiving part, the second passage is connected to the first passage on the upstream side in the flow direction of an outflow port formed on the downstream side in the flow direction of the lubricant oil along the rotation direction of the rotating member in the first passage, and the lubricant oil supplying apparatus further comprises a suppression structure that suppresses flow of the lubricant oil in the first passage from a connection part to the second passage toward the outflow port.

In the lubricant oil supplying apparatus, it is preferable that, as the suppression mechanism, a space between the rotating member and the first component part on the downstream side in the flow direction of the connection part is smaller than a space between the rotating member and the first component part on the upstream side in the flow direction of the connection part.

In the lubricant oil supplying apparatus, it is preferable that the connection part is formed in a position opposed to an outer peripheral face of the rotating member, the first component part has a side wall opposed to a side face of the rotating member, a step is formed in a position corresponding to the connection part, in a wall face opposed to a side face of the rotating member in the side wall, a space between a side face of the rotating member and the wall face on the downstream side in the flow direction of the step is smaller than a space between a side face of the rotating member and the wall face on the upstream side in the flow direction of the step, and the step extends in a direction of guiding the lubricant oil flowing along the wall face to the connection part.

In the lubricant oil supplying apparatus, it is preferable that the connection part is formed in a position opposed to an outer peripheral face of the rotating member, and in the second passage, the oil receiving part side is positioned on a downstream side in the flow direction of the connection part side.

In the lubricant oil supplying apparatus, it is preferable that the second component part has a cylindrical shape in which the second passage is formed.

In the lubricant oil supplying apparatus, it is preferable that the connection part is formed in a position opposed to an outer peripheral face of the rotating member, and a width of the second passage in the axial direction of the rotating member is similar to a width of an outer peripheral face of the rotating member in an axial direction of the rotating member.

In the lubricant oil supplying apparatus, it is preferable that the connection part is formed in a position opposed to an outer peripheral face of the rotating member, the rotating member is a helical gear, and the second passage is inclined to a side on which a tooth face on a front side in the rotational direction of the rotating member in an axial direction of the rotating member is directed from the connection part toward the oil receiving part.

In the lubricant oil supplying apparatus, it is preferable that the connection part is formed in a position opposed to an outer peripheral face of the rotating member, the second component part has inner wall faces opposed to each other in the axial direction of the rotating member while sandwiching the second passage, and in the inner wall face to which a tooth face on a rear side in the rotational direction of the rotating member is directed, as one of the inner wall faces opposed to each other, a projection which projects toward the other inner wall face is formed.

In the lubricant oil supplying apparatus, it is preferable that the connection part is formed in a position opposed to an outer peripheral face of the rotating member, and a rectifying member is disposed in the second passage.

In the lubricant oil supplying apparatus, it is preferable that a passage sectional area on the oil receiving part side in the second passage is smaller than a passage sectional area on the connection part side.

In the lubricant oil supplying apparatus, it is preferable to include a backward flow suppression structure that allows movement of the lubricating oil from the connection part side in the second passage toward the oil receiving part side and suppresses movement of the lubricating oil from the oil receiving part side toward the connection part side.

In the lubricant oil supplying apparatus, it is preferable that the second passage has at least a passage for low speed in which the lubricating oil flows toward the oil receiving part in the case where rotation speed of the rotating member is low, and a passage for high speed having a passage sectional area larger than that of the passage for low speed and to which the lubricant oil flows toward the oil receiving part in the case where the rotational speed of the rotating member is high.

In the lubricant oil supplying apparatus, it is preferable that a third passage in which the lubricant oil can circulate is formed between an inner peripheral face of a case of the power transmission apparatus and the passage member, on the outside in the radial direction of the rotating member of the first and second passages, and in the case where rotational speed of the rotating member is high, the lubricant oil apart from the rotating member passes through the third passage and moves toward the oil receiving part.

In the lubricant oil supplying apparatus, it is preferable that the rotating member engages with a predetermined rotating member as another rotating member, and as the suppression structure, the outflow port is connected to an engagement part between the rotating member and the predetermined rotating member via an oil passage formed by the passage member.

In the lubricant oil supplying apparatus, it is preferable to include at least one of a mechanism of allowing the lubricant oil in the first passage escape to the outside in accordance with pressure in the first passage and a mechanism of allowing the lubricant oil in the second passage escape to the outside in accordance with pressure in the second passage.

In the lubricant oil supplying apparatus, it is preferable to include an outflow port guiding member that guides the lubricant oil which flows from the outflow port to the accumulating part.

In the lubricant oil supplying apparatus, it is preferable that the first component part is opposed to the outer peripheral face and both side faces of the rotating member.

In the lubricant oil supplying apparatus, it is preferable that the passage member is supported relatively movably in the axial direction to the rotating member.

A lubricant oil supplying apparatus of the present invention includes an accumulating part that accumulates lubricant oil; a rotating member that is connected to a drive wheel of a vehicle and rotates interlockingly with rotation of the drive wheel to feed the lubricant oil in the accumulating part; an oil receiving part that is disposed above the rotating member in the vertical direction and supplies the lubricant oil to a member to be lubricated; and a passage member, wherein the passage member is provided so as to be opposed to the rotating member along a circumferential direction of the rotating member and forms, between the rotating member and itself, a first passage in which the lubricant oil fed by the rotating member flows, in the first passage, a part in which a space between the rotating member and the passage member is smaller than the other part in a flow direction of the lubricant oil along the rotation direction of the rotating member in the first passage exists, and a second passage guiding the lubricant oil in the first passage to the oil receiving part is connected on the upstream side in the flow direction of the part in which the space is small in the first passage.

Advantages Effect of Invention

The lubricant oil supplying apparatus according to the present invention has a suppression structure for suppressing flow of a lubricant oil from a connection part to a second passage toward an outflow port in a first passage. The structure promotes the flow of the lubricant oil which flows from the first passage to the second passage and flows upward in the vertical direction toward an oil receiving part. Therefore, the lubricant oil supplying apparatus according to the present invention produces an effect that the performance of feeding the lubricant oil to the upper side in the vertical direction can be improved.

DESCRIPTION OF EMBODIMENTS

In the following, embodiments of a lubricant oil supplying apparatus according to the present invention will be described in detail with reference to the drawings. The present invention, however, is not limited by the embodiments. The components in the embodiments include a component which can be easily assumed by a person skilled in the art or is substantially the same.

First Embodiment

Figure 1:
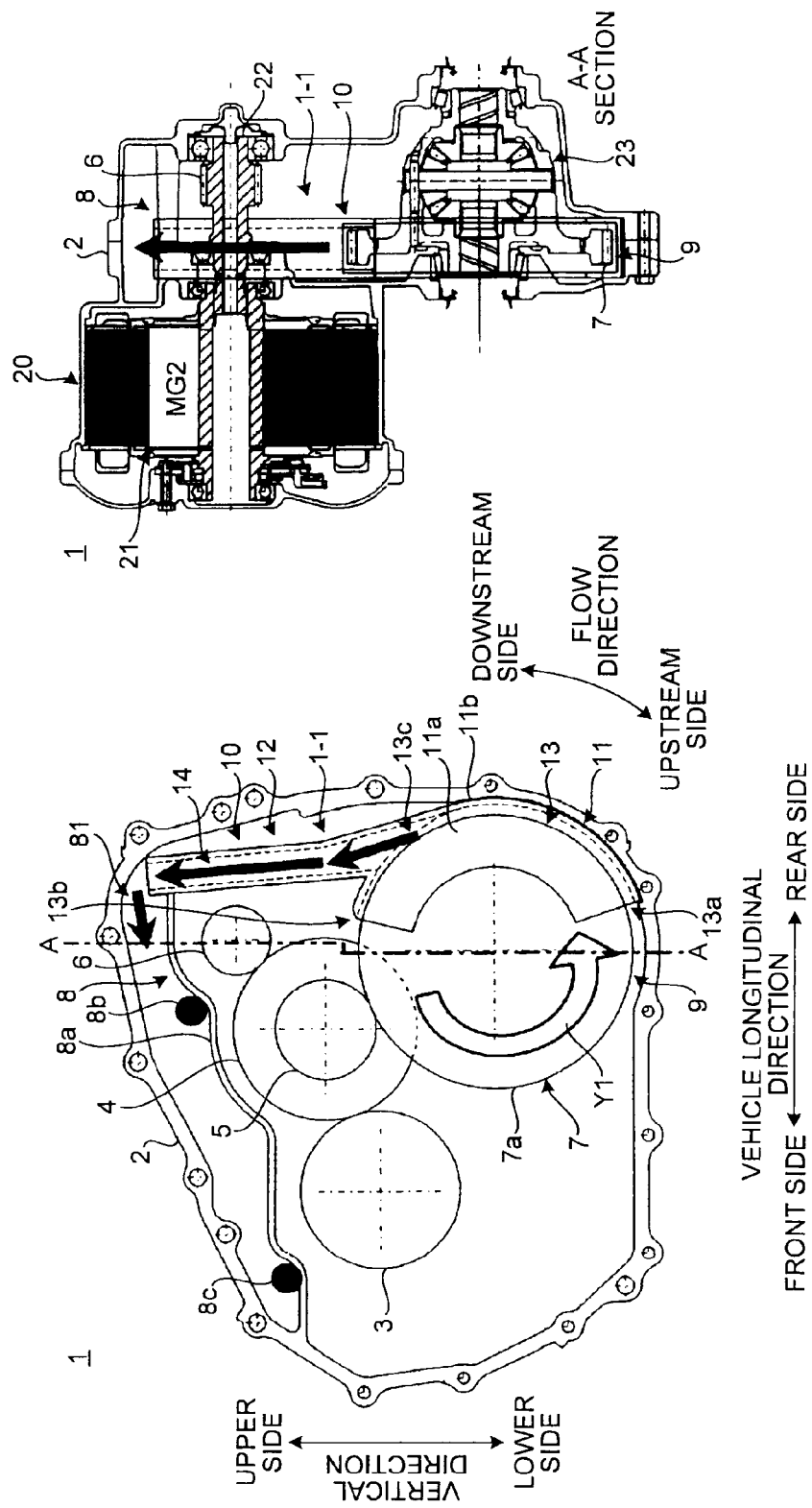
FIG. 1 is a front view and a cross sectional view illustrating a power transmission apparatus according to a first embodiment of the present invention.
Figure 2:
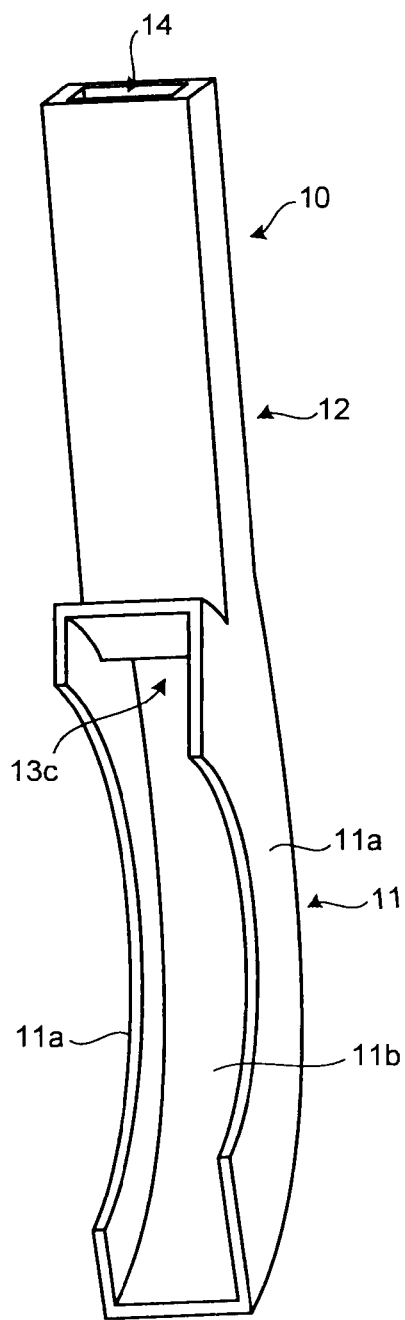
FIG. 2 is a perspective view illustrating a passage member of the embodiment.

FIG. 1 shows a front view and a cross sectional view illustrating a power transmission apparatus according to a first embodiment of the present invention. FIG. 2 is a perspective view illustrating a passage member of the embodiment.

A lubricating oil supplying apparatus of the embodiment supplies lubricant oil to an oil receiving part. By providing a differential ring gear (final ring gear) with a duct-shaped case (a passage member which will be described later), the lubricating oil is guided to a place which is not reached in a conventional differential feed-up structure by a pump effect of the passage member and the differential ring gear. With the configuration, lower cost of an oil pump and reduction of drag torque can be achieved.

In FIG. 1, reference numeral 1 denotes a power transmission apparatus of a hybrid vehicle (not shown). Reference numeral 1-1 denotes a lubricant oil supplying apparatus of the embodiment. The power transmission apparatus 1 has a case 2. In the case 2, a counter drive gear 3, a counter driven gear 4, a drive pinion gear 5, an MG2 reduction gear 6, a differential ring gear (rotating member) 7, an oil receiving part 8, an accumulating part 9, and a passage member 10 are provided. The counter drive gear 3 is disposed on the front side of the counter driven gear 4 in the vehicle longitudinal direction, and the MG2 reduction gear 6 and the differential ring gear 7 are disposed on the rear side of the counter driven gear 4 in the vehicle longitudinal direction.

The counter drive gear 3 is connected to the output shaft of a not-shown engine and the rotary shaft of a first motor generator (MG1) via a planetary gear mechanism, and an output of the engine is dividedly input to the counter drive gear 3 and MG1. The counter driven gear 4 and the drive pinion gear 5 are disposed coaxially and rotate integrally. The counter driven gear 4 engages with the counter drive gear 3. The MG2 reduction gear 6 is coupled to a rotary shaft 22 of a rotor 21 of a second motor generator (MG2) 20 and rotates integrally with the rotor 21. The MG2 reduction gear 6 engages with the counter driven gear 4. The diameter of the MG2 reduction gear 6 is smaller than that of the counter driven gear 4, and an output of the MG2 (20) is amplified and transmitted from the MG2 reduction gear 6 to the counter driven gear 4.

The drive pinion gear 5 engages with the differential ring gear 7, and an output torque of the engine and an output torque of the MG2 (20) supplied to the counter driven gear 4 are transmitted to the differential ring gear 7 via the drive pinion gear 5. The differential ring gear 7 connected to a not-shown drive wheel via a differential mechanism 23 and rotates interlockingly with rotation of the drive wheel. Arrow Y1 shows the rotation direction of the differential ring gear 7 when the vehicle travels forward. The MG2 reduction gear 6 is disposed above the differential ring gear 7 in the vertical direction.

In a lower part in the vertical direction in the case 2, the accumulating part 9 for accumulating lubricant oil (for example, ATF) is formed. The differential ring gear 7 is disposed in a lower part in the case 2. In the case where the lubricant oil is accumulated in the accumulating part 9, a part of the differential ring gear 7 is soaked in the accumulated lubricant oil. Above the differential ring gear 7 in the case 2 in the vertical direction, the oil receiving part 8 is provided. The oil receiving part 8 is constructed so as to be able to accumulate the lubricant oil, and the lubricant oil in the oil receiving part 8 is supplied to a part to be lubricated in the power transmission apparatus 1. The oil receiving part 8 is partitioned from the lower space by a rib 8a projected from the inner wall face of the case 2. The lubricant oil in the oil receiving part 8 is supplied to the MG2 (20) via a supply hole 8b and to the MG1 via a supply hole 8c to lubricate and cool the MG1 and the MG2 (20). The lubricant oil in the oil receiving part 8 may be supplied to another part to be lubricated in the power transmission apparatus 1.

The differential ring gear 7 rotates interlockingly with the rotation of the drive wheel and sends the lubricant oil in the accumulating part 9. Although there is a conventionally known technique of flipping up the lubricating oil in the accumulating part to a supply destination such as the oil receiving part above in the vertical direction by a rotating member such as the differential ring gear 7, such a flip-up method has problems such that the lubricant oil is not delivered to the supply destination or sufficient amount is not supplied under the following situations:

(a) the vehicle speed is low (because the rotational speed of the differential ring gear is small).

(b) the supply destination is higher than the axis of the differential ring gear (because the force of the lubricant oil is weak for the height).

(c) the supply destination is on the rear side of the differential ring gear in the vehicle (because it is difficult to set the splashing direction of the lubricant oil to a target).

(d) the vehicle climbs on a hill (because the lubricating oil around the differential ring gear increases and the force of the splashing lubricant oil decreases).

The lubricant oil supplying apparatus 1-1 of the embodiment has the passage member 10 for guiding the lubricant oil sent by the differential ring gear 7 to the oil receiving part 8. Consequently, even when the vehicle speed is low or when the oil receiving part 8 is in a position which is high on the rotation axis of the differential ring gear 7, the lubricant oil can be supplied to the oil receiving part 8.

The passage member 10 has a first component part 11 and a second component part 12. The first component part 11 is provided so as to face the differential ring gear 7 along the circumferential direction of the differential ring gear 7 and forms a first passage 13 as a passage in which the lubricant oil sent by the differential ring gear 7 flows between the differential ring gear 7 and itself. The first component part 11 has a pair of side walls 11a opposed to each other while sandwiching the differential ring gear 7 in the axial direction and a curved part 11b opposed to an outer peripheral face 7a of the differential ring gear 7 in the radial direction and formed in a shape corresponding to the outer peripheral face 7a. The curved part 11b is disposed coaxially with the differential ring gear 7, and the size of the gap between the curved part 11b and the outer peripheral face 7a is uniform in the circumferential direction. Outside ends in the radial direction of the side walls 11a and 11b are connected to each other by the curved part 11b. That is, the first component part 11 faces both of side faces of the differential ring gear 7 and the outer peripheral face 7a of the differential ring gear 7, and the first passage 13 as a passage of the lubricating oil is formed between the first component part 11 and the differential ring gear 7.

A region for mounting the first component part 11 in the circumferential direction of the differential ring gear 7 is a region slightly smaller than the semiperimeter of the differential ring gear 7 and is a region in which the tooth face on the front side in the rotational direction of the differential ring gear 7 faces upward in the vertical direction. In other words, the range in the circumferential direction in which the first passage 13 is formed for the differential ring gear 7 is formed corresponds to a range in which the lubricant oil is fed upward in the vertical direction by the rotation of the differential ring gear 7. Consequently, an inflow port 13a of the lubricant oil in the first passage 13 is positioned at the lower end in the vertical direction of the first passage 13, and an outflow port 13b formed on the downstream side in the flow direction of the lubricant oil along the rotation direction of the differential ring gear 7 is positioned at the upper end in the vertical direction of the first passage 13. In the inflow port 13a the outer peripheral face of the curved part 11b is in contact with the bottom face of the case 2, and the lubricant oil fed by the rotation of the differential ring gear 7 flows in the first passage 13 from the inflow port 13a.

The second component part 12 forms a second passage 14 connected to the first passage 13 and guiding the lubricant oil in the first passage 13 to the oil receiving part 8. The second passage 14 is connected to the first passage 13 on the upstream side of the outflow port 13b in the flow direction of the lubricant oil along the rotation direction of the differential ring gear 7 in the first passage 13. In the following description, the upstream side and the downstream side in the flow direction of the lubricant oil along the rotation direction (Y1) of the differential ring gear 7 in the first passage 13 will be simply called "upstream side of the first passage 13" and "downstream side of the first passage 13", respectively. The second passage 14 is connected to the first passage 13 from the outside in the radial direction. An opening is formed in the curved part 11b of the first component part 11. The opening is a connection part 13c between the first passage 13 and the second passage 14 and is the inflow port of the second passage 14. That is, the connection part 13c as the inflow port of the second passage 14 is opposed to the outer peripheral part 7a of the differential ring gear 7 in the radial direction.

The second passage 14 is open toward the upstream side of the first passage 13. The second component part 12 is formed in a chimney shape (cylindrical shape) having a rectangular shape in section in which the second passage 14 is formed, and extends in the vertical direction from the connection part 13c toward the oil receiving part 8. Since the second component part 12 has a cylindrical shape and is closed except for its both ends of the second passage 14, the movement direction of the lubricant oil in the second passage 14 is regulated only in the axial direction of the second component part 12 and decrease in the hydraulic pressure is suppressed, so that the force of guiding the lubricant oil upward increases. The sectional area of the second passage 14 is larger than that of the first passage 13. The lower end of the second passage 14 is connected to the first passage 13 in the connection part 13c and the upper end is open toward an inflow port 81 of the oil receiving part 8.

When the differential ring gear 7 rotates, the lubricant oil in the accumulating part 9 is sent to the differential ring gear 7 and flows in the first passage 13 from the inflow port 13a. By continuously feeding the lubricant oil into the first passage 13 by the differential ring gear 7, the hydraulic pressure in the first passage 13 rises. That is, the first passage 13 functions as an oil concentrating part for collecting the lubricant oil around the differential ring gear 7 and increasing the pressure of the lubricant oil. When the hydraulic pressure in the first passage 13 rises, the lubricant oil in the first passage 13 goes up in the second passage 14 toward the oil receiving part 8. That is, the differential ring gear 7 and the passage member 10 function as a pump for increasing the hydraulic pressure of the lubricant oil and feeding the lubricant oil upward. The second passage 14 also functions as a guiding part for guiding the travel direction of the concentrated lubricant oil from the rotating direction of the differential ring gear 7 to the upside in the vertical direction.

The lubricant oil flowing in the first passage 13 along the rotation direction of the differential ring gear 7 by the rotation of the differential ring gear 7 flows from the connection part 13c connected to the second passage 14 toward the outflow port 13b and the second passage 14. The lubricant oil supplying apparatus 1-1 of the embodiment has a suppression structure of suppressing the flow of the lubricant oil from the connection part 13c toward the outflow part 13b in the first passage 13. The suppression structure is that the second passage 14 extends from the connection part 13c toward the outside in the radial direction, and the lubricant oil which receives centrifugal force tends to flow toward the second passage 14, in the second passage 14, the oil receiving part 8 side is positioned on the downstream side of the first passage 13 than the side of the connection part 13c, so that the lubricant oil tends to flow from the first passage 13 to the second passage 14 along the tangential direction, the sectional area of the second passage 14 is larger than that of the first passage 13, the outflow port 13b is positioned on the upper side in the vertical direction than the connection part 13c, and the like. The suppression structure of the embodiment includes the passage member 10 and the differential ring gear 7. The connection part 13c is formed in a position opposed to the outer peripheral face 7a of the differential ring gear 7, and the second passage 14 extends from the connection part 13c to the outside in the radial direction, so that the lubricant oil fed to the second passage 14 by the force of the rotation of the differential ring gear 7 can move upward in the second passage 14 by the force.

As described above, in the lubricant oil supplying apparatus 1-1 of the embodiment, the lubricant oil is fed upward in the case 2 by using not only the energy (force) generated by the rotational force of the differential ring gear 7 but also the pump effect of the differential ring gear 7 and the passage member 10. The flow of the lubricant oil from the connection part 13c toward the outflow port 13b is suppressed, and the flow of the lubricant oil toward the second passage 14 is promoted, so that the lubricant oil is fed to the upper part in the case 2 via the second passage 14. Therefore, even when the vehicle speed is low or when the oil receiving part 8 is in a high position seen from the rotary shaft of the differential ring gear 7, the lubricant oil can be supplied to the oil receiving part 8. That is, by the lubricant oil supplying apparatus 1-1, the performance of feeding the lubricant oil upward in the vertical direction is improved. Without splashing the lubricant oil, by making the lubricant oil concentrated in the first passage 13 and then guiding the lubricant oil upward to the oil receiving part 8, the lubricant oil can be efficiently supplied to the oil receiving part 8.

Since the lubricant oil supplying apparatus 1-1 uses the hydraulic pressure generated by the pump effect, the lubricant oil can be easily fed toward the oil receiving part 8 regardless of the position of the oil receiving part 8. For example, also in the case such that the inflow port 81 of the oil receiving part 8 is positioned on the rear side in the vehicle more than the center axial line of the differential ring gear 7, different from the case where the lubricant oil is splashed by the rotation of the differential ring gear 7, the lubricant oil can be supplied easily to the oil receiving part 8.

Although the case where the lubricant oil supplying apparatus 1-1 is provided for the power transmission apparatus of a hybrid vehicle has been described as an example in the embodiment, the present invention is not limited to the case. The lubricant oil supplying apparatus 1-1 may be applied to a power transmission apparatus of another type, such as MT (Manual Transmission).

In the embodiment, the first component part 11 is opposed to both side faces of the differential ring gear 7 and the outer peripheral face 7a. However, the present invention is not limited to the configuration. The first component part 11 may face at least one of faces of the differential ring gear 7.

Although the second component part 12 has a chimney shape (cylindrical shape) in the embodiment, the present invention is not limited to the shape. Any shape may be used as long as the lubricant oil can be guided to the oil receiving part 8.

Second Embodiment

Figure 3:
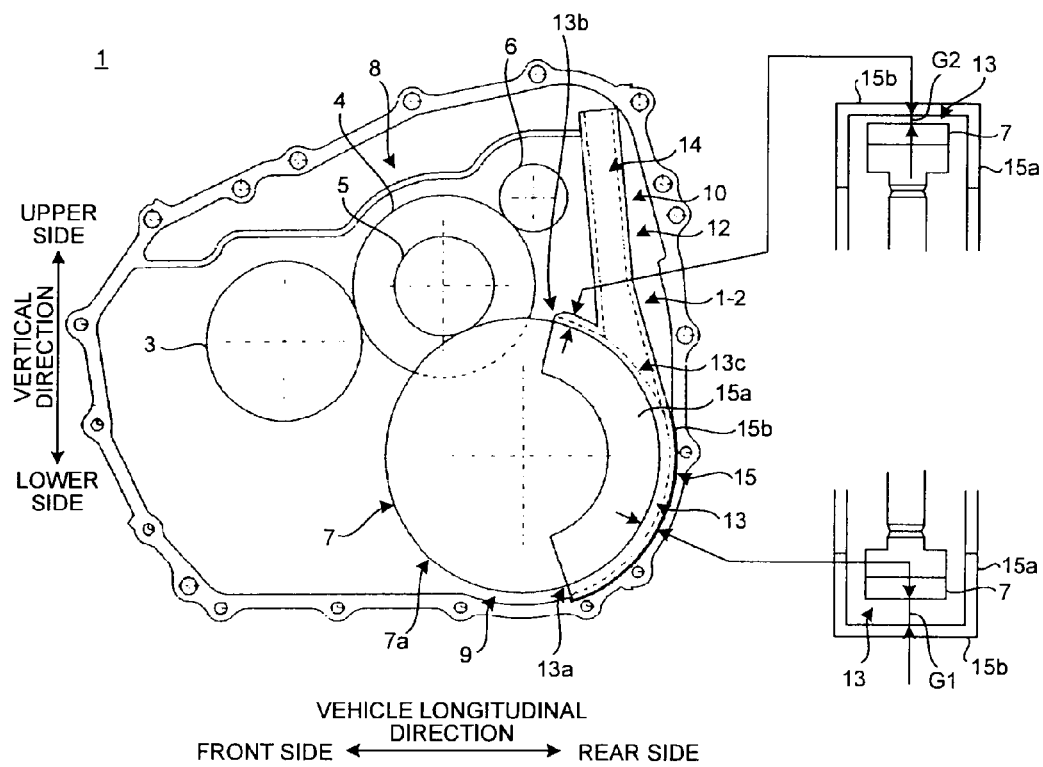
FIG. 3 is a front view and a cross sectional view illustrating a power transmission apparatus according to a second embodiment.

Referring to FIG. 3, a second embodiment will be described. In the second embodiment, the same reference numerals are designated to members having the same functions as those described in the foregoing embodiment and repetitive description will not be given. FIG. 3 is a front view and a cross sectional view illustrating a power transmission apparatus according to a second embodiment.

A lubricant oil supplying apparatus 1-2 of the second embodiment is different from the lubricant oil supplying apparatus 1-1 of the first embodiment with respect to the point that, in the first passage 13, clearance G2 in the radial direction between the differential ring gear 7 on the outflow port 13b side and a first component part 15 is smaller than clearance G1 in the radial direction between the differential ring gear 7 on the inflow port 13a side and the first component part 11. With the configuration, the effect of suppressing the flow of the lubricant oil from the connection part 13c toward the outflow port 13b is increased.

As shown in FIG. 3, the passage member 10 of the lubricant oil supplying apparatus 1-2 of the embodiment has, in a manner similar to the first embodiment, the first component part 15 forming the first passage 13 as a passage of the lubricant oil between the passage member 10 and the differential ring gear 7 and the second component part 12. The first component part 15 has a pair of side walls 15a like the side walls 11a of the first embodiment and a curved part 15b opposed to the outer peripheral face 7a of the differential ring gear 7 and formed in a shape corresponding to the outer peripheral face 7a. In the first passage 13, the clearance in the radial direction between the differential ring gear 7 and the curved part 15b varies according to the position in the circumferential direction. The clearance G2 on the outflow port 13b side is smaller than the clearance G1 on the inflow port 13a side. In the embodiment, the clearance on the inflow port 13a side of the connection port 13c and that on the outflow port 13b side are different from each other. The clearance G2 on the downstream side (the outflow port 13b side) in the first passage 13 of the connection part 13c is smaller than the clearance G1 on the upstream side (the inflow port 13a side) in the first passage 13 of the connection part 13c.

Since the clearance G2 on the outflow port 13b side is smaller than the clearance G1 on the inflow port 13a side as described above, by having the large clearance G1 in the first passage 13 on the inflow port 13a side, the lubricant oil can be accumulated in the radial direction by the rotation of the differential ring gear 7. On the other hand, it is difficult for the lubricant oil to pass through the first passage 13 on the outflow port 13b side, and flow of the lubricant oil from the connection part 13c toward the outflow port 13b is suppressed. As a result, when the hydraulic pressure in the first passage 13 increases, the pump effect produced by the differential ring gear 7 and the passage member 10 increases, and a large amount of the lubricant oil is sent to the upper part of the second passage 14. That is, with the lubricant oil supplying apparatus 1-2 of the embodiment, the performance of feeding the lubricant oil upward in the vertical direction improves. The suppression structure of the embodiment includes the first component part 15 and the differential ring gear 7.

On the downstream side in the first passage 13 of the connection part 13c, the range in which the gap between the differential ring gear 7 and the first component part 15 is made smaller than that on the upstream side of the connection part 13c may not be the entire range on the downstream side. By providing a part in which the gap is smaller as compared with the other part in a part in the flow direction along the rotation direction of the differential ring gear 7 and connecting the second passage 14 on the upstream side in the flow direction of the part in which the gap is small in the first passage 13, flow of the lubricant oil from the connection part 13c toward the outflow port 13b is suppressed.

Third Embodiment

Figure 4:
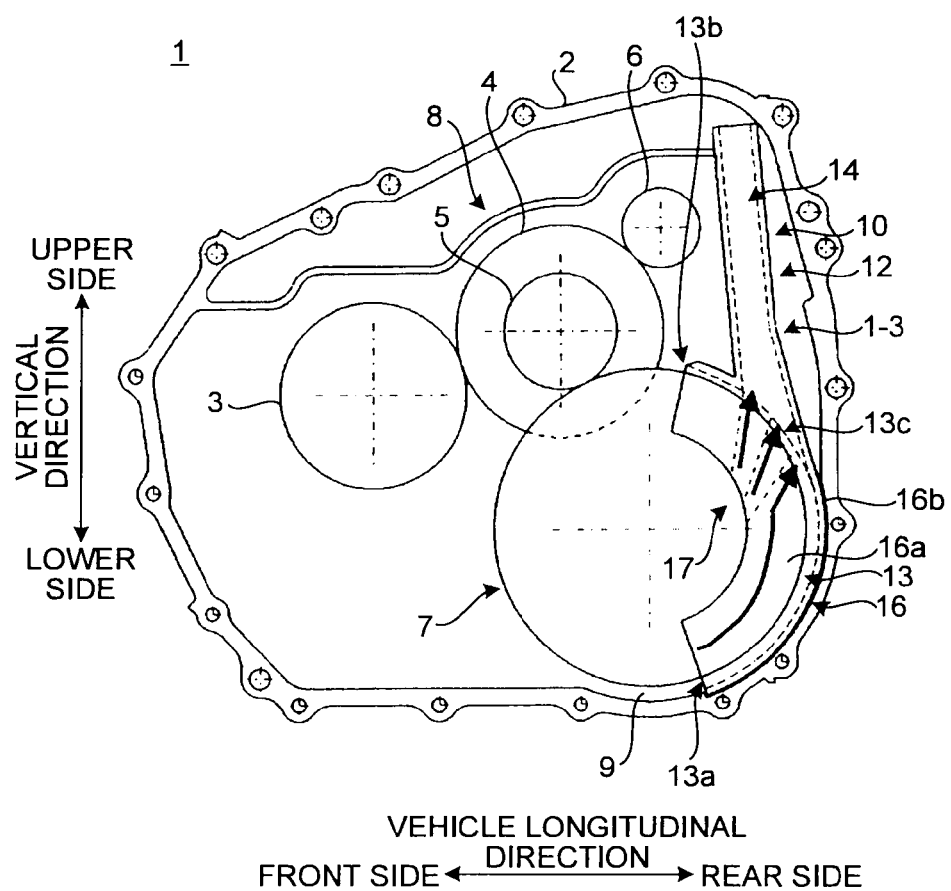
FIG. 4 is a front view illustrating a power transmission apparatus according to a third embodiment.
Figure 5:
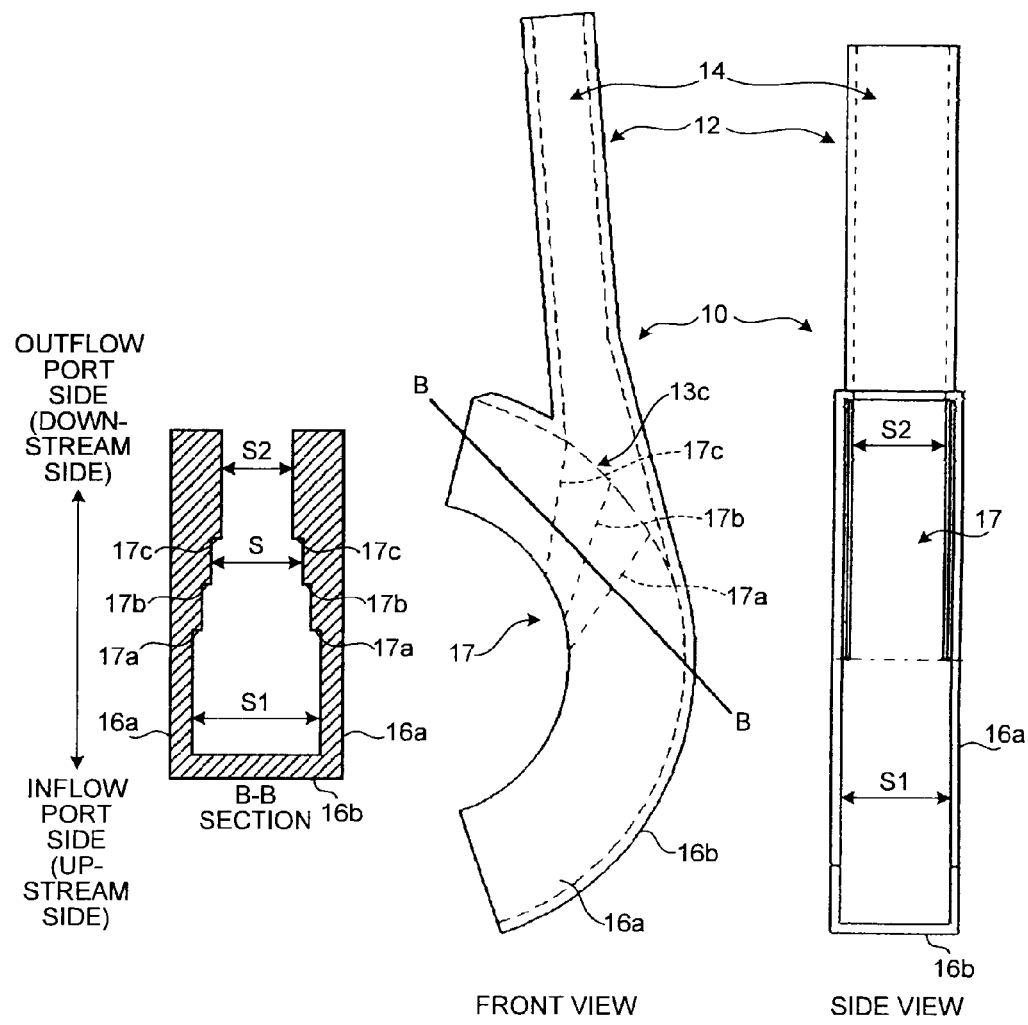
FIG. 5 is a front view, a side view, and a cross sectional view illustrating the passage member according to the third embodiment.

Referring to FIGS. 4 and 5, a third embodiment will be described. In the third embodiment, the same reference numerals are designated to members having the same functions as those described in the foregoing embodiment and repetitive description will not be given. FIG. 4 is the front view illustrating a power transmission apparatus according to a third embodiment. FIG. 5 is a front view, a side view, and a cross sectional view illustrating the passage member according to the third embodiment.

A lubricant oil supplying apparatus 1-3 of the embodiment is different from that of the foregoing embodiments with respect to the point that a guide part 17 for guiding the lubricant oil flowing sides of the differential ring gear 7 to the outside in the radial direction is provided. The lubricant oil is guided to the outside in the radial direction by the guide part 17 and flow of the lubricant oil to the second passage 14 is promoted, so that a larger amount of the lubricant oil is guided upward in the second passage 14 and supplied to the oil receiving part 8.

As shown in FIG. 4, the passage member 10 of the lubricant oil supplying apparatus 1-3 of the embodiment has, in a manner similar to the foregoing embodiments, a first component part 16 forming the first passage 13 as a passage of the lubricant oil between the passage member 10 and the differential ring gear 7 and the second component part 12. The second component part 12 has a configuration similar to that of the second component part 12 in any of the foregoing embodiments. A curved part 16*b* of the first component part 16 can have a configuration similar to that of the curved part 11*b* of the first embodiment or the curved part 15*b* of the second embodiment. In a manner similar to any of the foregoing embodiments, the connection part 13*c* is formed in a position opposed to the outer peripheral face 7*a* of the differential ring gear 7.

In the first component part 16, the pair of side walls 16*a* opposed to each other in the axial direction while sandwiching the differential ring gear 7 is provided with the guide part (steps) 17. The guide part 17 is provided in a position corresponding to the connection part 13*c* in the side walls 16*a* (the inner side in the radial direction of the connection part 13*c*). In the guide part 17, faces opposed to the pair of side walls 16*a* are formed in a step shape in which a space S decreases step by step from the inflow port 13*a* side toward the outflow port 13*b* side. In the side wall 16*a*, guide faces 17*a*, 17*b*, and 17*c* facing upstream side of the first passage 13 are formed.

The guide faces 17*a*, 17*b*, and 17*c* are inclined toward the outflow port 13*b* side to the outside in the radial direction. The lubricant oil flowing in the first passage 13 from the inflow port 13*a* and flowing along the side wall 16*a* is guided to the guide faces 17*a*, 17*b*, and 17*c* and flows to the outside in the radial direction. Each of the guide faces 17*a*, 17*b*, and 17*c* extends in a direction of guiding the lubricant oil flowing along the face of the side wall 16*a* to the connection part 13*c*, and the lubricant oil guided to the guide faces 17*a*, 17*b*, and 17*c* flows from the connection part 13*c* to the second passage 14. That is, outflow of the lubricant oil flowing between the side wall 16*a* and the differential ring gear 7 directly from the outflow port 13*b* is suppressed, and a large amount of the lubricant oil flows in the second passage 14. The lubricant oil guided to the second passage 14 by the guide faces 17*a*, 17*b*, and 17*c* rises along the second passage 14 toward the oil receiving part 8 by the force of the flow of the lubricant oil. In such a manner, according to the embodiment, the energy of the flow of the lubricant oil is effectively used as the energy of feeding the lubricant oil to the oil receiving part 8.

The space S in the axial direction of the pair of side walls 16*a* on the inflow port 13*a* side of the guide part 17 and that on the outflow port 13*b* side are different from each other, and a space S2 on the outflow port 13*b* side is smaller than a space S1 on the inflow port 13*a* side. That is, the space between the side face of the differential ring gear 7 and the side wall 16*a* on the upstream side in the first passage 13 of the guide part 17 is larger than that between the side face of the differential ring gear 7 and the side wall 16*a* on the downstream side of the guide part 17. The guide part 17 is formed in a position corresponding to the connection part 13*c*. With the configuration, flow of the lubricant oil from the connection part 13*c* toward the outflow port 13*b* is suppressed. That is, the suppression structure of the embodiment includes the first component part 16 and the differential ring gear 7. The space S2 on the outflow port 13*b* side is equal to the width in the axial direction of the second passage 14. Since the flow toward the outflow port 13*b* is suppressed, the pressure in the first passage 13 rises, the pump effect increases, and the lubricant oil is fed upward in the case 2 via the second passage 14.

As described above, with the lubricant oil supplying apparatus 1-3, the performance of feeding the lubricant oil to the upside in the vertical direction improves. The guide part 17 may have a tapered shape in which the space S decreases continuously from the upstream side toward the downstream side of the first passage 13 in place of the shape in which the space S decreases discontinuously (step by step).

Fourth Embodiment

Figure 6:
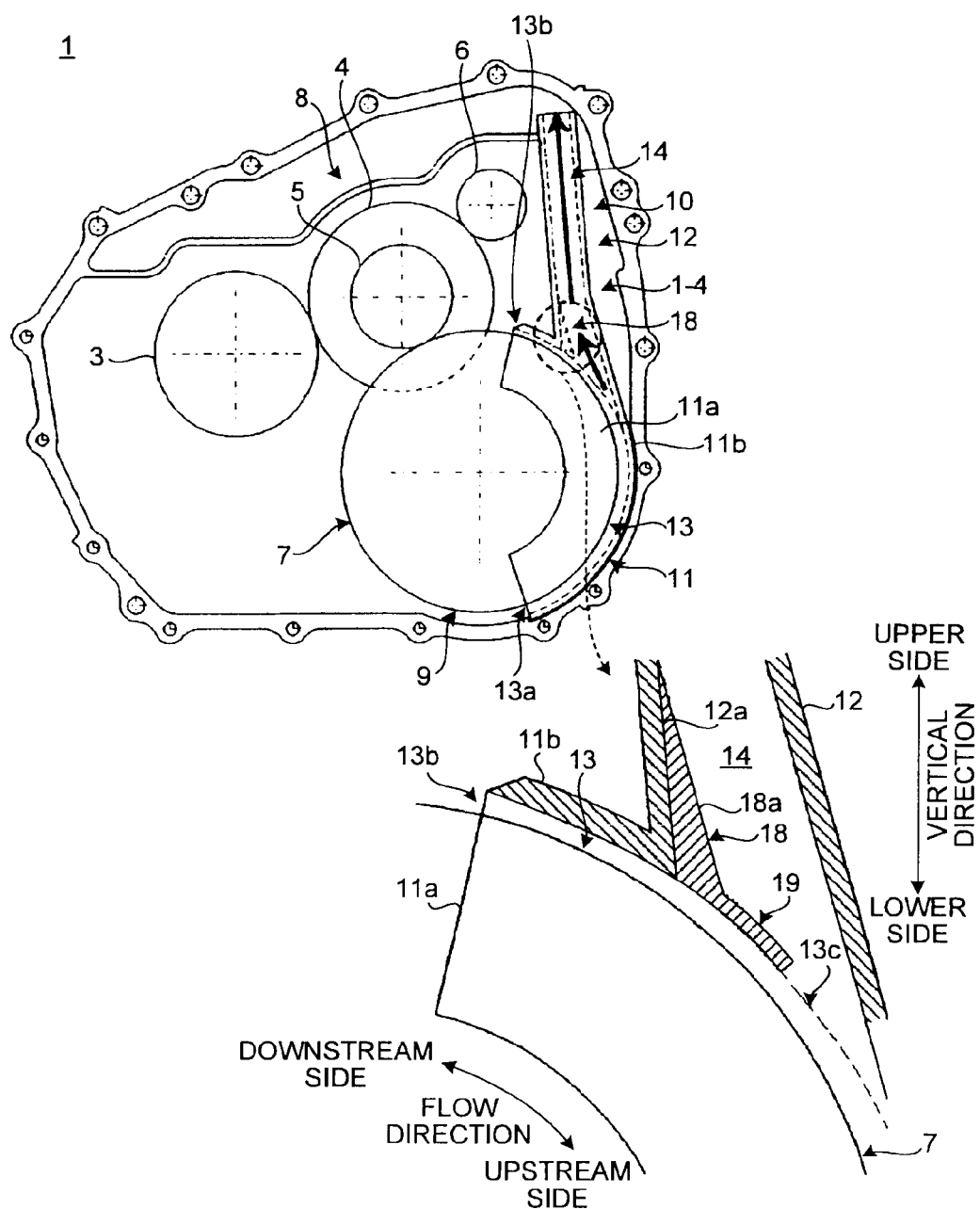
FIG. 6 is a front view and a main-part enlarged view illustrating a power transmission apparatus according to a fourth embodiment.
Figure 7:
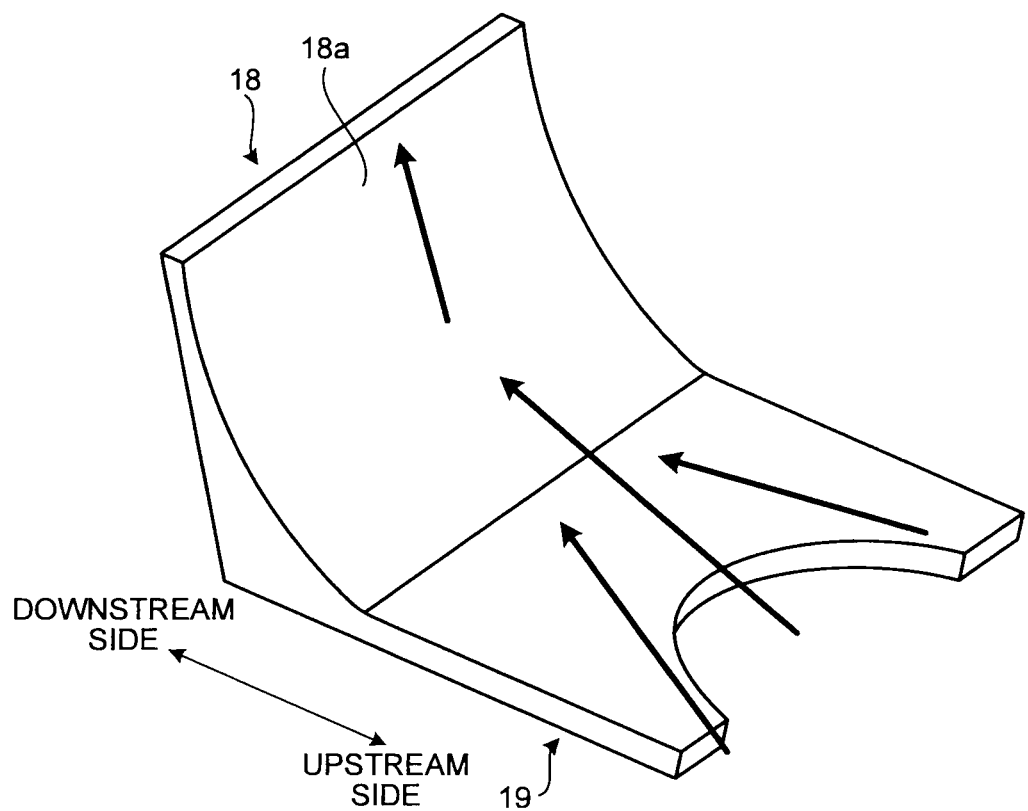
FIG. 7 is a perspective view illustrating a guide member.
Figure 8:
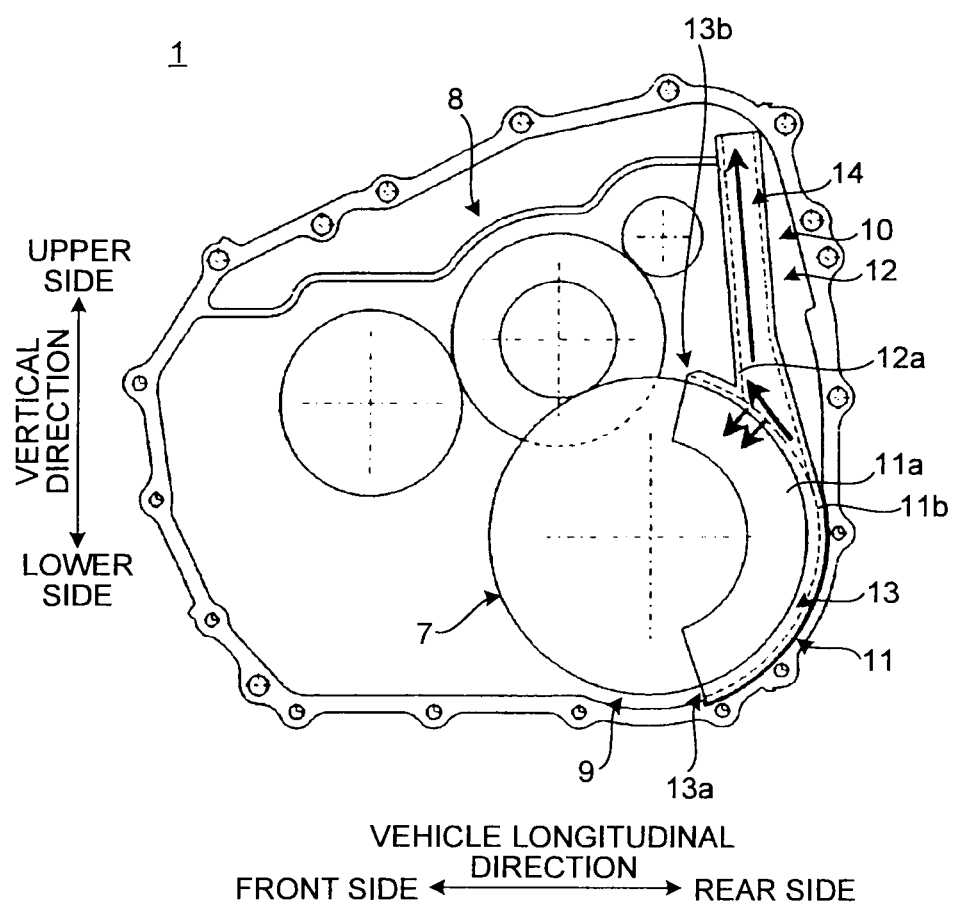
FIG. 8 is a diagram illustrating an example of a lubricant oil supplying apparatus having no guide member.

With reference to FIGS. 6 to 8, a fourth embodiment will be described. In the fourth embodiment, the same reference numerals are designated to members having the same functions as those described in the foregoing embodiments and repetitive description will not be given. FIG. 6 is a front view and a main-part enlarged view illustrating a power transmission apparatus according to the fourth embodiment. FIG. 7 is a perspective view illustrating a guide member. FIG. 8 is a diagram illustrating an example of a lubricant oil supplying apparatus having no guide member.

A lubricant oil supplying apparatus 1-4 of the embodiment is different from any of the lubricant oil supplying apparatuses of the foregoing embodiments with respect to the point that a guide member 18 for guiding the lubricant oil flowing in the circumferential direction to the second passage 14 is provided for the connection part 13*c* between the first passage 13 and the second passage 14. By the guide member 18, the flow of the lubricant oil from the first passage 13 to the second passage 14 can be made smooth.

As shown in FIG. 6, the guide member 18 is provided for the connection part 13*c*. The guide member 18 is provided on an inner wall face 12*a* on the downstream side of the first passage 13 in the second component part 12 and is projected from the inner wall face 12*a* to the upstream side of the first passage 13. The projection of the guide member 18 to the upstream side of the first passage 13 increases toward the lower side in the vertical direction. Since the angle formed between the guide member 18 and the flow direction of the lubricating oil flowing in the first passage 13 is smaller than that formed between the inner wall face 12*a* and the flow direction, the lubricant oil can be guided from the first passage 13 to the second passage 14 more smoothly than the case where the guide member 18 is not provided. In the case where the guide member 18 is not provided, as shown in FIG. 8, the lubricant oil flowing from the upstream side of the first passage 13 to the downstream side strongly collides with the inner wall face 12*a* and flows back to the differential ring gear 7. On the other hand, in the lubricant oil supplying apparatus 1-4 of the embodiment, as shown in FIG. 6, the lubricant oil can be smoothly guided to the second passage 14 by the guide member 18. As shown in FIG. 7, in the guide member 18, since a guide face 18*a* for guiding the lubricant oil has a curved face recessed to the downstream side of the first passage 13, the flow direction of the lubricant oil can be smoothly changed.

A plate-shaped member 19 is provided at the lower end in the vertical direction of the guide member 18. The plate-shaped member 19 is a member having a plate shape, extends in the circumferential direction of the differential ring gear 7, and is opposed to the differential ring gear 7 in the radial direction. The plate-shaped member 19 projects toward the upstream side of the first passage 13 and guides the lubricant oil to the guide member 18. As shown in FIG. 7, the front end of the plate-shaped member 19 has a U-shaped notch and both ends in the width direction (the axial direction of the differential ring gear 7) project to the upstream side of the first passage 13. Consequently, the lubricant oil guided to the guide member 18 by the plate-shaped member 19 is concentrated in the center portion in the width direction of the plate-shaped member 19 and the guide member 18. Therefore, the lubricant oil can be smoothly passed from the first passage 13 to the second passage 14. Thus, with the lubricant oil supplying apparatus 1-4 of the embodiment, the performance of feeding the lubricant oil upward in the vertical direction improves.

Fifth Embodiment

Figure 9:
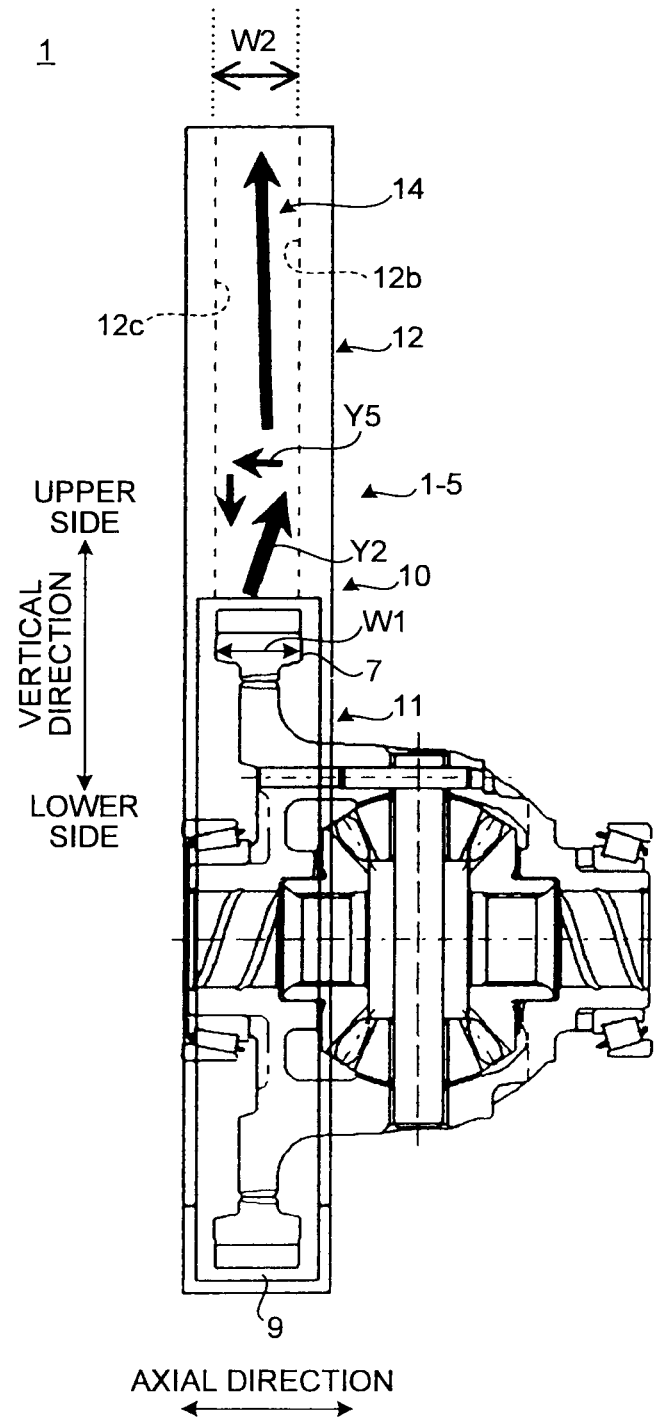
FIG. 9 is a side view illustrating a power transmission apparatus according to a fifth embodiment.
Figure 10:
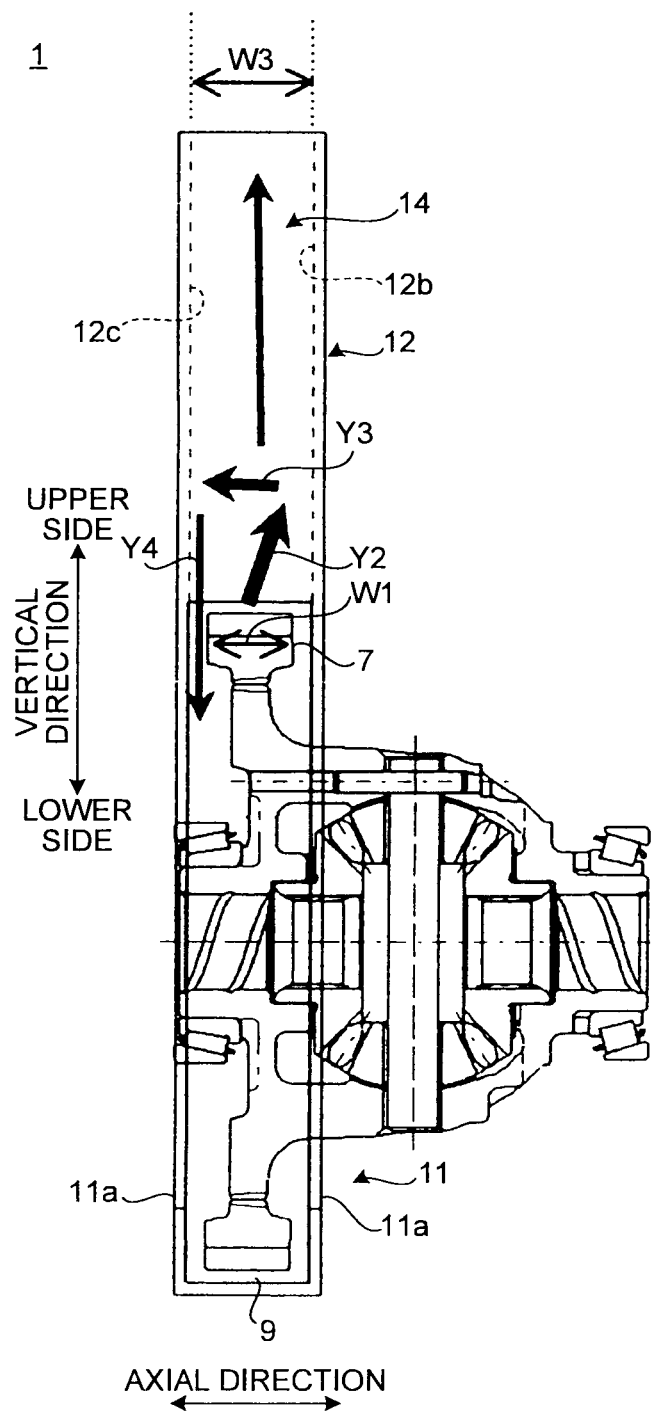
FIG. 10 is a diagram for explaining an eddy generated in a second passage.

With reference to FIGS. 9 and 10, a fifth embodiment will be described. In the fifth embodiment, the same reference numerals are designated to members having the same functions as those described in the foregoing embodiments and repetitive description will not be given. FIG. 9 is a side view illustrating a power transmission apparatus according to the fifth embodiment. FIG. 10 is a diagram for explaining an eddy generated in a second passage.

A lubricant oil supplying apparatus 1-5 of the embodiment is different from any of the lubricant oil supplying apparatuses of the foregoing embodiments with respect to the point that a structure of suppressing generation of an eddy in the second passage 14 is provided. In the case where the differential ring gear 7 is a helical gear, the lubricant oil is pushed out in the oblique direction according to the direction of the tooth trace. That is, the lubricant oil fed to the second passage 14 by the rotation of the differential ring gear 7 flows to one side in the axial direction as shown by arrow Y2 in FIGS. 9 and 10. Consequently, the lubricant oil flows upward in the vertical direction along an inner wall face 12$b$ as one of inner wall faces 12$b$ and 12$c$ opposed to each other in the axial direction in the second component part 12, so that an eddy is formed in the second passage 14. As shown in FIG. 10, the flow from the one inner wall face 12$b$ to the other inner wall face 12$c$ (refer to arrow Y3) is created, and the lubricant oil flows downward in the vertical direction along the other inner wall face 12$c$ (refer to arrow Y4), so that the lubricant oil flows backward from the second passage 14 toward the differential ring gear 7. That is, an eddy which changes the flow of the lubricant oil toward the oil receiving part 8 in the second passage 14 to the flow toward the first passage 13 is generated. Such a backward flow of the lubricant oil tends to occur in the case where width W3 in the axial direction of the second passage 14 is larger than tooth width (width of the outer peripheral face) W1 of the differential ring gear 7 as shown in FIG. 10.

In the lubricant oil supplying apparatus 1-5 of the embodiment, as shown in FIG. 9, the width W2 in the axial direction of the second passage 14 is similar to the tooth width W1 of the differential ring gear 7. The "width is similar" means that the width W2 of the second passage 14 is almost the same as the tooth width W1 of the differential ring gear 7. For example, the width W2 in the axial direction of the second passage 14 is the same as the tooth width W1 of the differential ring gear 7. With the configuration, occurrence of an eddy in the second passage 14 and occurrence of the backward flow of the lubricant oil is suppressed. By adjusting the width W2 in the axial direction of the second passage 14 to the tooth width W1 of the differential ring gear 7, passage of the lubricant oil from the second passage 14 to the down side in the vertical direction is suppressed, and occurrence of the flow (arrow Y5) from the one inner wall face 12$b$ toward the other inner wall face 12$c$ is suppressed in the second passage 14. By suppressing the passage of the lubricant oil to the lower side from the second passage 14 and suppressing occurrence of an eddy, the lubricant oil is supplied efficiently to the oil receiving part 8 via the second passage 14. That is, with the lubricant oil supplying apparatus 1-5 of the embodiment, the performance of feeding the lubricant oil upward in the vertical direction improves.

Sixth Embodiment

Figure 11:
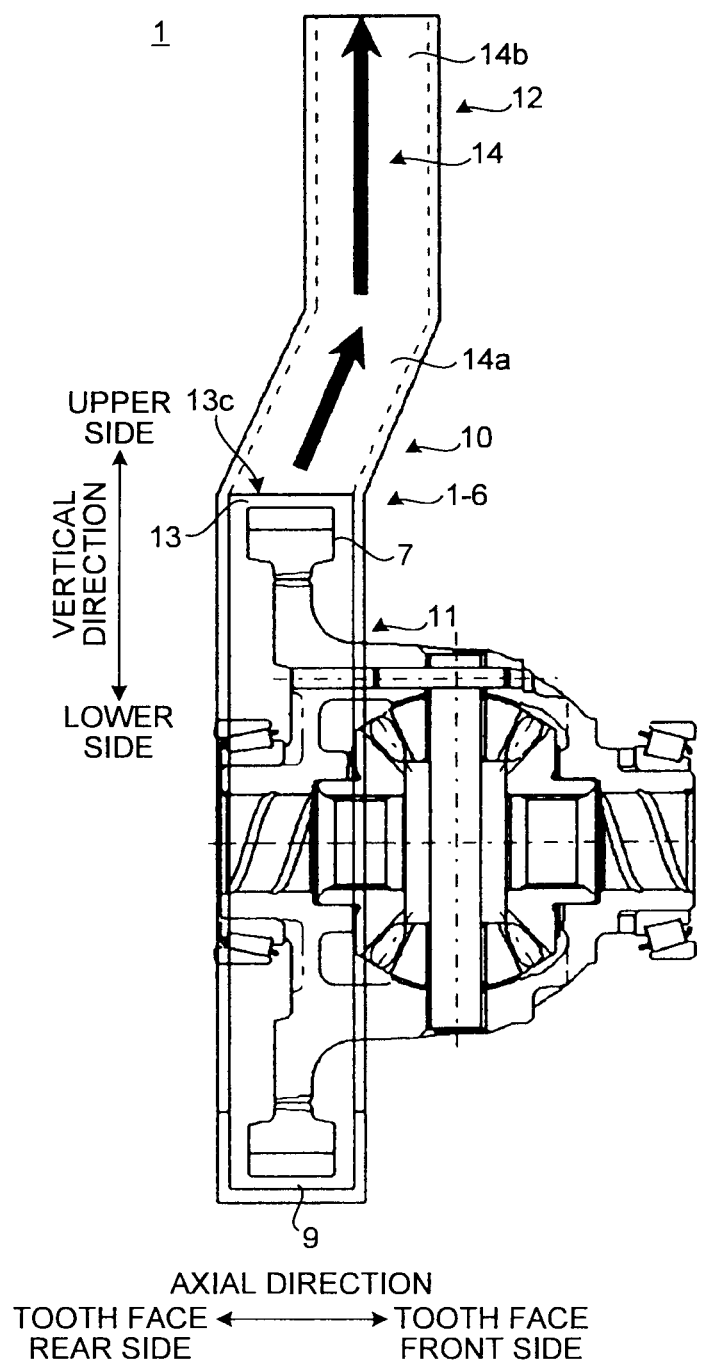
FIG. 11 is a side view illustrating a power transmission apparatus according to a sixth embodiment.

With reference to FIG. 11, a sixth embodiment will be described. In the sixth embodiment, the same reference numerals are designated to members having functions similar to those described in the foregoing embodiments and repetitive description will not be given. FIG. 11 is a side view illustrating a power transmission apparatus according to the sixth embodiment.

A lubricant oil supplying apparatus 1-6 of the embodiment is different from any of the lubricant oil supplying apparatuses of the foregoing embodiments with respect to the point that the second passage 14 is inclined so as to suppress generation of an eddy in the second passage 14. The second passage 14 is inclined in the direction of splash of the lubricant oil fed by the differential ring gear 7. With the configuration, occurrence of an eddy of the lubricant oil in the second passage 14 is suppressed. The connection part 13$c$ is formed in the position opposed to the outer peripheral face of the differential ring gear 7.

As shown in FIG. 11, in the second passage 14, a part 14$a$ (hereinbelow, written as "inclined part 14$a$ of the second passage 14") near the connection part 13$c$ connected to at least the first passage 13 is inclined in the flow direction of the lubricant oil fed by the differential ring gear 7 as a helical gear in the vertical direction. The inclination direction corresponds to the side to which a tooth surface on the front side (hereinbelow, simply described as "tooth face front side") in the rotational direction of the differential ring gear 7 in the axial direction, and the inclined part 14$a$ of the second passage 14 is inclined toward the tooth face front side upward in the vertical direction. The tooth face on the front side in the rotation direction is the tooth face on the front side in the rotation direction of the differential ring gear 7 when the vehicle travels forward.

The configuration suppresses that the lubricant oil sent to the second passage 14 by the differential ring gear 7 flows only along one of the inner wall faces in the second passage 14. Therefore, generation of an eddy in the second passage 14 is suppressed, and the performance of feeding the lubricant oil upward in the vertical direction improves. In the second passage 14, a part 14$b$ which is upper in the vertical direction than the inclined part 14$a$ is not inclined in the axial direction. With the configuration, increase in the total extension of the second passage 14 is suppressed.

Seventh Embodiment

Figure 12:
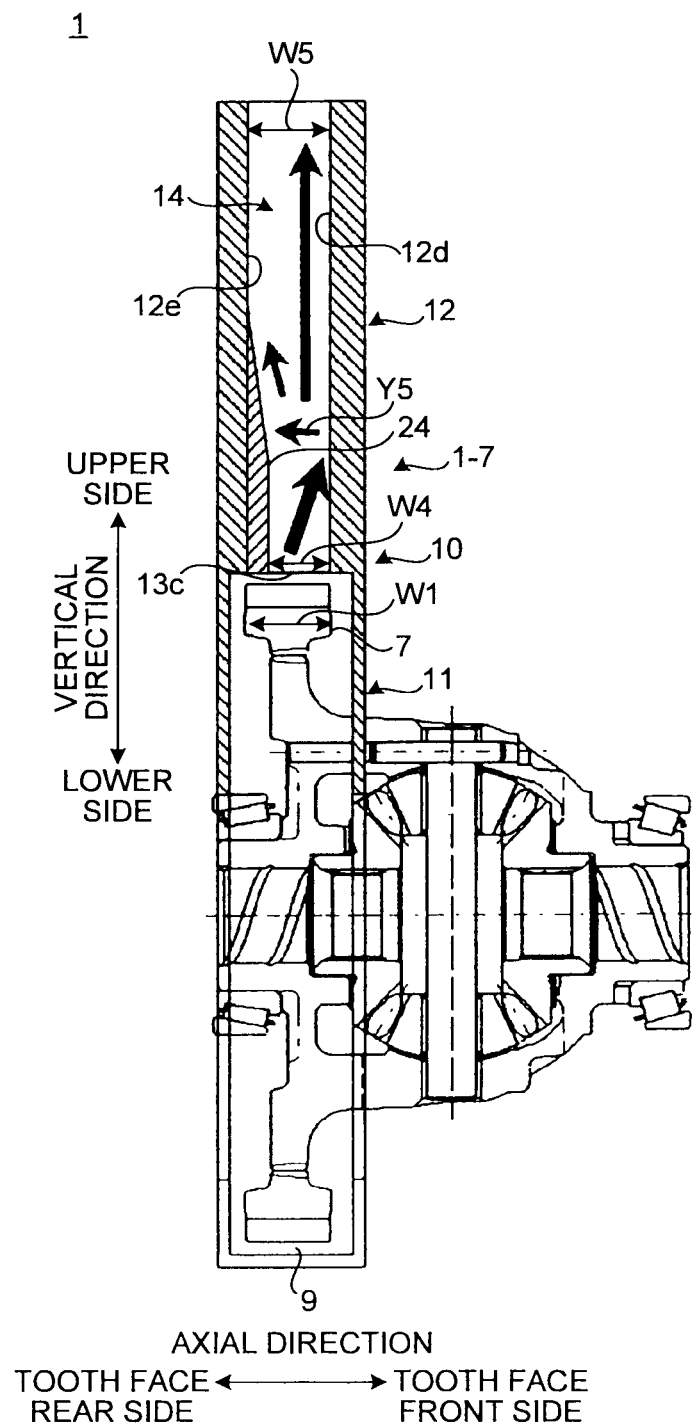
FIG. 12 is a side view illustrating a power transmission apparatus according to a seventh embodiment.

Referring to FIG. 12, a seventh embodiment will be described. In the seventh embodiment, the same reference numerals are designated to members having functions similar to those described in the foregoing embodiments and repetitive description will not be given. FIG. 12 is a side view illustrating a power transmission apparatus according to the seventh embodiment.

A lubricant oil supplying apparatus 1-7 of the embodiment is different from any of the lubricant oil supplying apparatuses of the foregoing embodiments with respect to the point that a projection for suppressing generation of an eddy in the second passage 14 is provided. The connection part 13c is formed in a position opposed to the outer peripheral face of the differential ring gear 7.

As shown in FIG. 12, the second component part 12 is provided with a projection 24. The projection 24 is disposed in a lower part in the vertical direction in the second component part 12 and, in other words, in a predetermined range toward the upside in the vertical direction from the connection part 13c. The second component part 12 has inner wall faces 12d and 12e opposed to each other in the axial direction while sandwiching the second passage 14. The projection 24 is provided for the inner wall face 12e on the side to which the tooth face on the rear side in the rotation direction of the differential ring gear 7 is directed (hereinbelow, described as "tooth face rear side") as one of the inner wall faces 12d and 12e opposed to each other. The projection 24 is formed in a plate shape and is opposed in the axial direction to the inner wall face 12d on the tooth face front side in the second component part 12. The projection 24 is projected toward the inner wall face 12d on the tooth front side, and a space in the axial direction between the projection 24 and the inner wall face 12d has a constant size on the lower side in the vertical direction but increases upward in the vertical direction on an upper side in the vertical direction. A space W4 between the projection 24 and the inner wall face 12d on the tooth face front side on the lower side in the vertical direction is smaller than tooth width W1 in the differential ring gear 7. Width W5 in the axial direction of the second passage 14 in a part in which the projection 24 is not provided is equal to that of the tooth width W1 of the differential ring gear 7.

As described above, the width in the axial direction of the channel in the lower part in the vertical direction of the second passage 14 is reduced by the projection 24, thereby suppressing passage of the lubricant oil from the second passage 14 to the lower side in the vertical direction. It suppresses generation of an eddy in the second passage 14 and improves the performance of feeding the lubricant oil upward in the vertical direction. Although the projection 24 is provided so that the width W4 on the inflow port of the second passage 14 becomes smaller than the tooth width W1 of the differential ring gear 7, the projection 24 is provided for the inner wall face 12e on the tooth face rear side, and the influence exerted on the flow of the lubricant oil fed to the second passage 14 by the differential ring gear 7 is small. Since the projection 24 is not provided in an upper part in the vertical direction of the second passage 14, the channel sectional area of the lubricant oil can be sufficiently assured.

In the second passage 14, the mounting position in the vertical direction of the projection 24 can be determined on the basis of, for example, the degree of deterioration in the efficiency of supplying lubricant oil due to occurrence of an eddy. For example, in the case where deterioration in the efficiency of supplying the lubricant oil is considerable due to occurrence of an eddy at a certain vehicle speed, it is sufficient to mount the projection 24 in a position where the eddy occurs easily at the vehicle speed.

Eighth Embodiment

Figure 13:
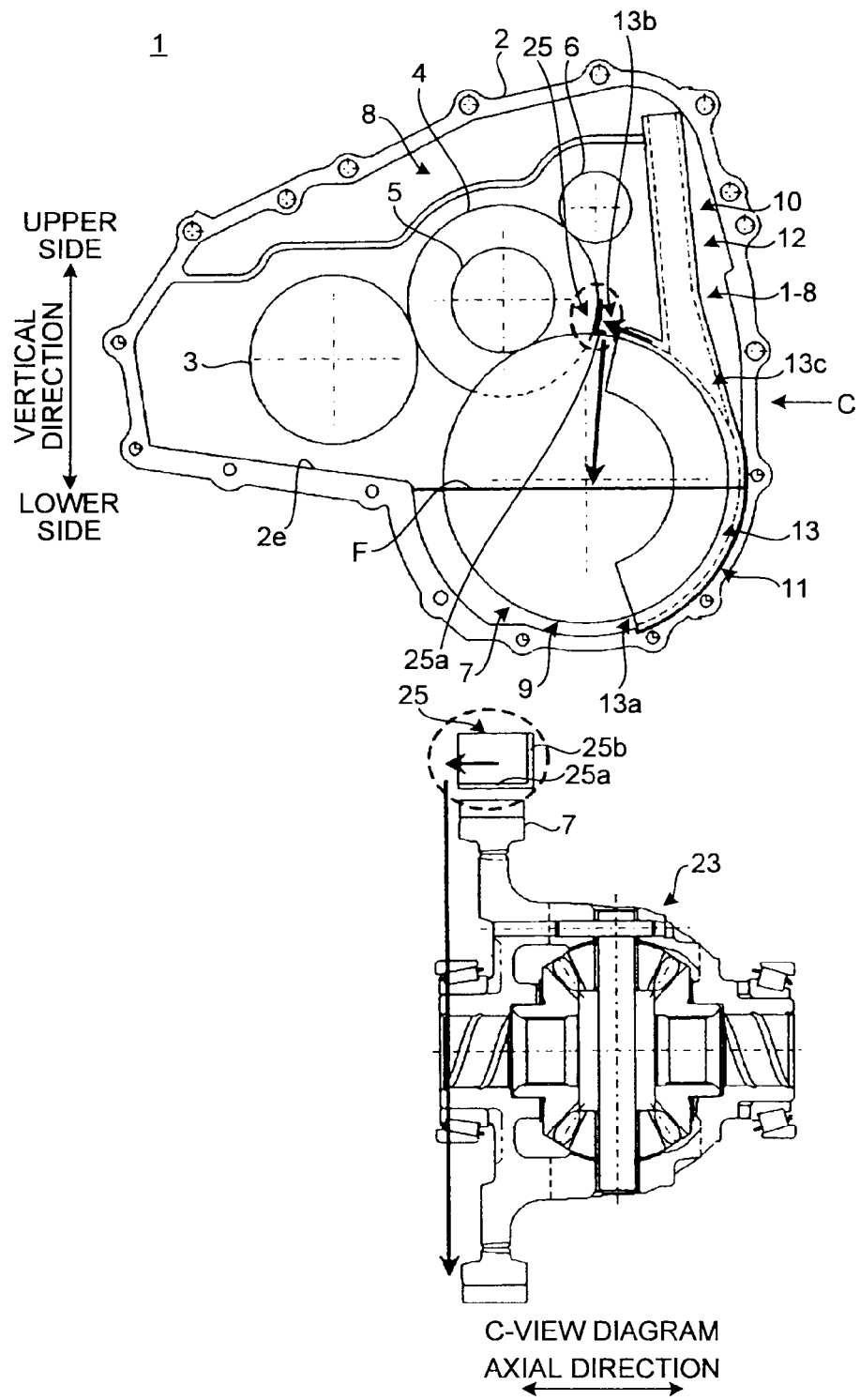
FIG. 13 is a front view and a side view illustrating a power transmission apparatus according to an eighth embodiment.

Referring to FIG. 13, an eighth embodiment will be described. In the eighth embodiment, the same reference numerals are designated to members having functions similar to those described in the foregoing embodiments and repetitive description will not be given. FIG. 13 is a front view and a side view illustrating a power transmission apparatus according to the eighth embodiment.

A lubricant oil supplying apparatus 1-8 of the embodiment is different from the lubricant oil supplying apparatuses of the foregoing embodiments with respect to the point that the oil level position in the accumulating part 9 is increased. With the configuration, the efficiency of supplying the lubricant oil to the oil receiving part 8 by the passage member and the differential ring gear 7 improves.

As shown in FIG. 13, the power transmission apparatus 1 is provided with a regulating member 25 for regulating splash of the lubricating oil which flows from the outflow port 13b of the first passage 13. The regulating member 25 faces the outflow port 13b, and the lubricating oil which flows out from the outflow port 13b collides with the regulating member 25 and drops down in the vertical direction. When the regulating member 25 is not provided, the lubricating oil which flows out from the outflow port 13b is splashed a lot into the air and remains in the air or a part to be lubricated such as gears. As a result, the oil level F in the accumulating part 9 drops. In the lubricant oil supplying apparatus 1-8, the lubricating oil is fed upward in the vertical direction by using not only the force of the rotation of the differential ring gear 7 but also the pump effect produced by the differential ring gear 7 and the passage member 10. In this case, there is a nature such that the higher the position of the oil level F is, the larger the amount of the lubricating oil is increased by the lubricant oil supplying apparatus 1-8. On the contrary, when the oil level F in the accumulating part 9 decreases, the difference in height from the oil level F and the oil receiving part 8 increases, and the supply amount of the lubricating oil to the oil receiving part 8 decreases.

In the embodiment, by providing the regulating member 25, decrease in the oil level F in the accumulating part 9 is suppressed. From the viewpoint of increasing the effect of suppressing the splash of the lubricant oil, preferably, the regulating member 25 is provided near the outflow port 13b. A passage part 25a for suppressing drop of the lubricating oil to the differential ring gear 7 is provided in the lower part in the vertical direction of the regulating member 25. The passage part 25a extends in the axial direction and projects toward the outflow port 13b. The passage part 25a receives the lubricant oil which collides the regulating member 25 and drops, guides the lubricant oil in the axial direction, and makes it drop to the side of the differential ring gear 7. The lubricant oil can therefore flow in the accumulating part 9 without dropping to the differential ring gear 7. That is, the regulating member 25 is an outflow port guiding member for guiding the lubricant oil which flows out from the outflow port 13b to the accumulating part 9. A side wall 25b is provided at an end of one side in the axial direction of the regulating member 25. The side wall 25b is provided at an end on the differential mechanism 23 side and extends in the vertical direction. The side wall 25b projects toward the outflow port 13b like the passage part 25a. By providing the side wall 25b, flow of the lubricant oil which collides with the regulating member 25 to the differential mechanism 23 side is suppressed, and the lubricant oil promptly flows in the accumulating part 9.

In the embodiment, the shape of the case 2 enables the oil level F in the accumulating part 9 to be high. In the case 2, a bottom face 2e on the front side of the vehicle of the differential ring gear 7 is formed in a position higher in the vertical direction than the lower bottom face of the differential ring gear 7. By eliminating a waste space in a lower part of the case 2, the lubricating oil can be made concentrated in the periphery of the differential ring gear 7. The bottom face 2e is inclined downward in the vertical direction from the front side of the vehicle toward the rear side. With the configuration, the lubricating oil dropped on the bottom face 2e promptly flows toward the accumulating part 9. As a result, drop of the oil level F in the accumulating part 9 is suppressed, the oil level F is positioned high, the amount of supply of the lubricating oil to the oil receiving part 8 by the lubricant oil supplying apparatus 1-8 increases, and the performance of feeding the lubricant oil upward in the vertical direction improves.

In the power transmission apparatus 1, oil level adjusting means for adjusting the oil level F of the accumulating part 9 may be provided. It is sufficient to adjust, by the oil level adjusting means, the height of the oil level F to a position at which the efficiency of feeding the lubricant oil to the oil receiving part 8 is high in accordance with the vehicle conditions such as vehicle speed, vehicle load, temperature of the lubricant oil, and the like.

Ninth Embodiment

Figure 14:
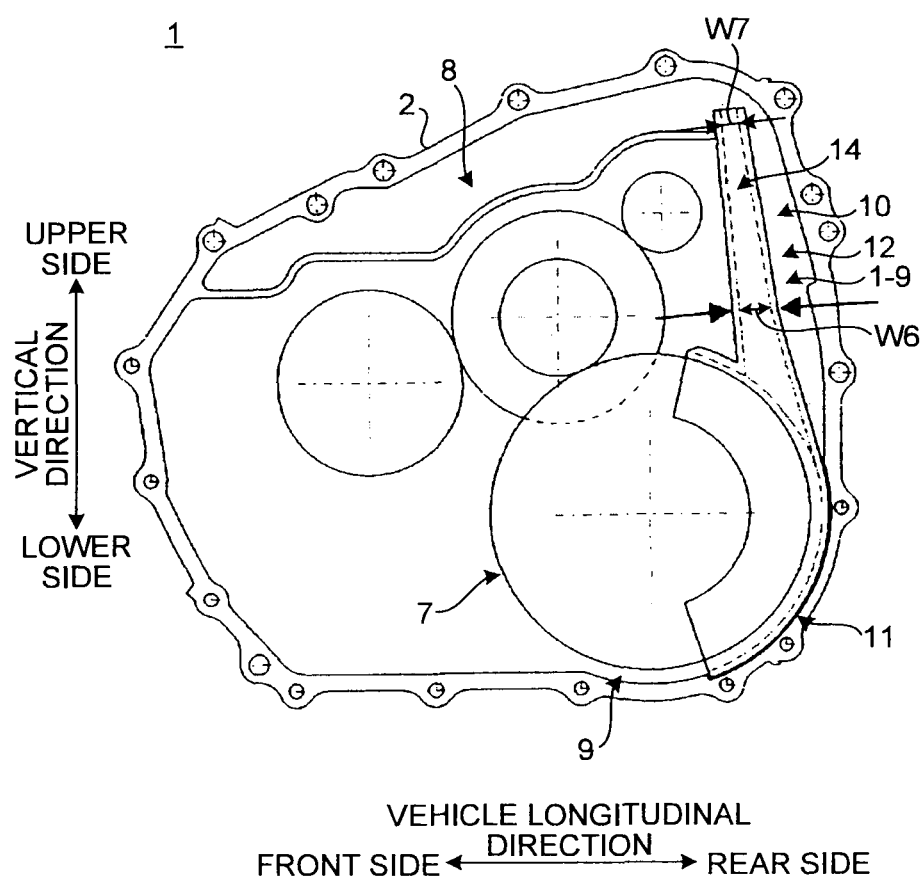
FIG. 14 is a front view illustrating a power transmission apparatus according to a ninth embodiment.

Referring to FIG. 14, a ninth embodiment will be described. In the ninth embodiment, the same reference numerals are designated to members having functions similar to those described in the foregoing embodiments and repetitive description will not be given. FIG. 14 is a front view illustrating a power transmission apparatus according to the ninth embodiment.

A lubricant oil supplying apparatus 1-9 of the embodiment is different from the lubricant oil supplying apparatuses of the foregoing embodiments with respect to the point that the second passage 14 is tapered. With the configuration, the flow velocity of the lubricant oil in the second passage 14 increases toward the upper side in the vertical direction. Therefore, even at low vehicle speed, the lubricating oil can be supplied to the oil receiving part 9. Even when the oil receiving part 8 is provided at a higher position, the lubricant oil can be supplied.

As shown in FIG. 14, in the lubricant oil supplying apparatus 1-9 of the embodiment, the width in the vertical direction of the vehicle of the second passage 14 on the upper side in the vertical direction and that on the lower side are different from each other. Width W7 of the second passage 14 on the upper side in the vertical direction is smaller than width W6 of the second passage 14 on the lower side in the vertical direction. The second passage 14 is formed in a tapered shape in which the width in the vehicle longitudinal direction decreases toward the upper side in the vertical direction. By setting the width W7 on the upper side in the vertical direction to be smaller than the width W6 on the lower side in the vertical direction in the second passage 14, the flow velocity of the lubricant oil in the position on the upper side in the vertical direction becomes higher than that of the lubricant oil in the position on the lower side in the vertical direction. Since the second passage 14 becomes gradually narrower from the lower side toward the upper side in the vertical direction and the flow velocity of the lubricant oil increases, even when the vehicle speed is low, the lubricant oil is supplied to the oil receiving part 8. By the lubricant oil supplying apparatus 1-9, the lubricant oil can be fed to a higher position in the case 2. That is, with the lubricant oil supplying apparatus 1-9, the performance of feeding the lubricant oil upward in the vertical direction improves.

Although the width in the vehicle longitudinal direction in the second passage 14 changes in the embodiment, instead of the width or in addition to the width, the width in the axial direction of the second passage 14 may be varied according to the position in the vertical direction. That is, it is sufficient that, in the second passage 14, the passage sectional area on the upper side in the vertical direction (the oil receiving part 8 side) is smaller than that on the lower side (the side of the connection part 13c). In the case of tapering the second passage 14 by making the width in the axial direction of the second passage 14 vary according to positions in the vertical direction, by setting the wall face on the tooth face rear side to be closer to the wall face on the tooth face front side toward the upper side in the vertical direction, the lubricant oil can be raised by effectively using the force of the lubricant oil fed by the differential ring gear 7. Although the width of the second passage 14 gradually changes in the embodiment, instead, the width of the second passage 14 may change step by step (discontinuously) from the lower side to the upper side in the vertical direction.

Tenth Embodiment

Figure 15:
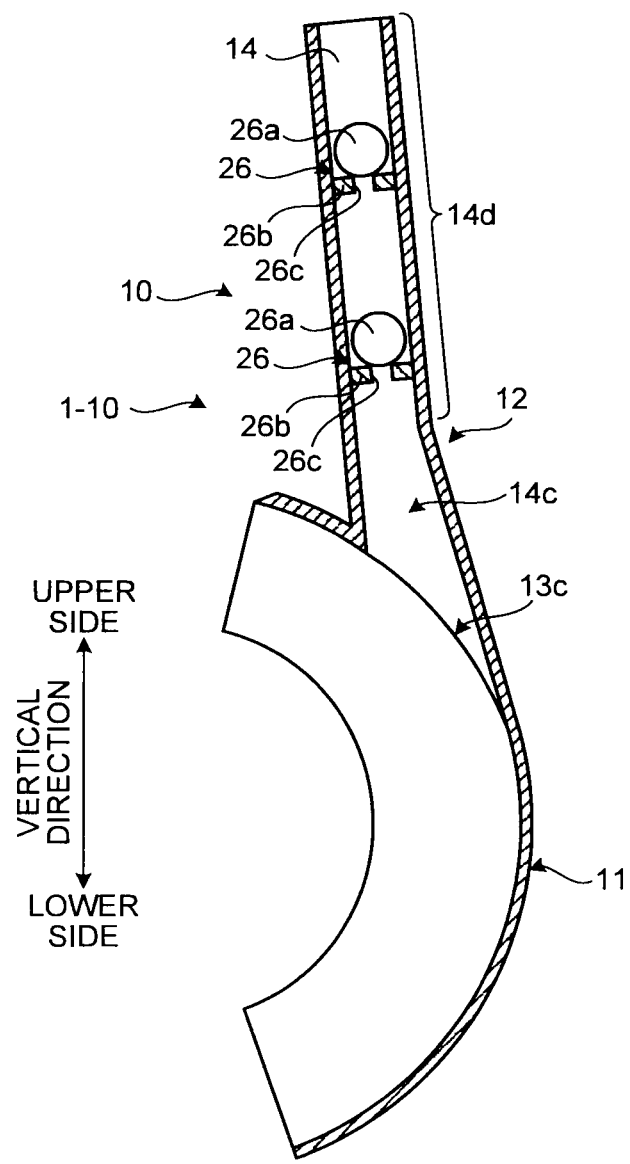
FIG. 15 is a front view illustrating a passage member of a lubricant oil supplying apparatus according to a tenth embodiment.

With reference to FIG. 15, a tenth embodiment will be described. In the tenth embodiment, the same reference numerals are designated to members having functions similar to those described in the foregoing embodiments and repetitive description will not be given. FIG. 15 is a front view illustrating the passage member 10 of a lubricant oil supplying apparatus 1-10 according to the tenth embodiment.

The lubricant oil supplying apparatus 1-10 of the embodiment is different from the lubricant oil supplying apparatuses of the foregoing embodiments with respect to the point that the second passage 14 is provided with a check valve of a check ball type (backflow suppress structure) of regulating backflow of the lubricant oil. In the case of feeding the lubricant oil to the oil receiving part 8 by rotation of the differential ring gear 7, there is a case that pulsation of the lubricant oil occurs in the second passage 14. By regulating backflow of the lubricant oil by the check valve, the lubricant oil can be fed to the oil receiving part 8 even at the rotational speed of the differential ring gear 7 at which pulsation occurs.

As described with reference to FIG. 10, there is a case that an eddy of the lubricant oil occurs in the second passage 14. When an attempt is made to feed up the lubricant oil to a higher position, the lubricant oil cannot be risen due to the weight of the lubricant oil, and an eddy occurs in a lower part (for example, the position indicated by reference numeral 14c in FIG. 15) in the second passage 14. Due to occurrence of the eddy, pulsation of the lubricant oil occurs in a part (hereinbelow, described as "pulsation part") 14d upper than an eddy occurrence position 14c in the second passage 14. In the embodiment, by providing the pulsation part 14d with a check valve 26, backflow of the lubricant oil and pulsation can be suppressed.

As shown in FIG. 15, two check valves 26 are provided in the pulsation part 14d in the second passage 14. The two check valves 26 are disposed in positions different from each other in the vertical direction and open or close the pulsation part 14d. The check valve 26 has a check ball 26a and a partition member 26b. The partition member 26b partitions the second passage 14 to the upper and lower sides in the vertical direction and is connected to the inner wall face of the second component part 12. In the partition member 26b, a through hole 26c penetrating the partition member 26b in the vertical direction is formed. The diameter of the through hole 26c is smaller than that of the check ball 26a. The check ball 26a is disposed on the upper side of the partition member 26b and can move vertically in the second passage 14.

When the differential ring gear 7 rotates and the lubricant oil is fed into the second passage 14, the hydraulic pressure acts from below on the check ball 26a and the check ball 26a is pushed up against gravity. As a result, the check valve 26 is opened and the lubricating oil flows upward in the vertical direction. That is, the check valve 26 allows movement of the lubricant oil from the connection part 13c side to the oil receiving part 8 side in the second passage 14. On the other hand, when the lubricant oil starts flowing downward in the vertical direction by the pulsation, the check ball 26a closes the through hole 26c and the check valve 26 is closed, so that the lubricant oil remains in the upper side of the partition member 26b. That is, the check valve 26 regulates movement of the lubricant oil from the oil receiving part 8 side toward the connection part 13c side. Consequently, the backflow of the lubricant oil in the second passage 14 is regulated, and the lubricant oil can be fed to the oil receiving part 8 by efficiently using the energy of the lubricant oil toward the upper side in the vertical direction. Thus, the performance of feeding the lubricant oil to the upper side in the vertical direction improves.

The check valve 26 is not limited to the passage to which the lubricant oil is fed by the force generated by the rotation of the differential ring gear 7 and the pressure of the pump effect as in the embodiment but may be also effectively provided for a passage to which the lubricant oil is fed by rotation of the differential ring gear 7 without using the pressure of the pump effect. For example, by providing the check valve 26 also for a cylindrical passage for guiding the lubricant oil fed by the rotation of the differential ring gear 7 to the oil receiving part 8, backflow of the lubricant oil and pulsation can be suppressed.

Modification of Tenth Embodiment

Figure 16:
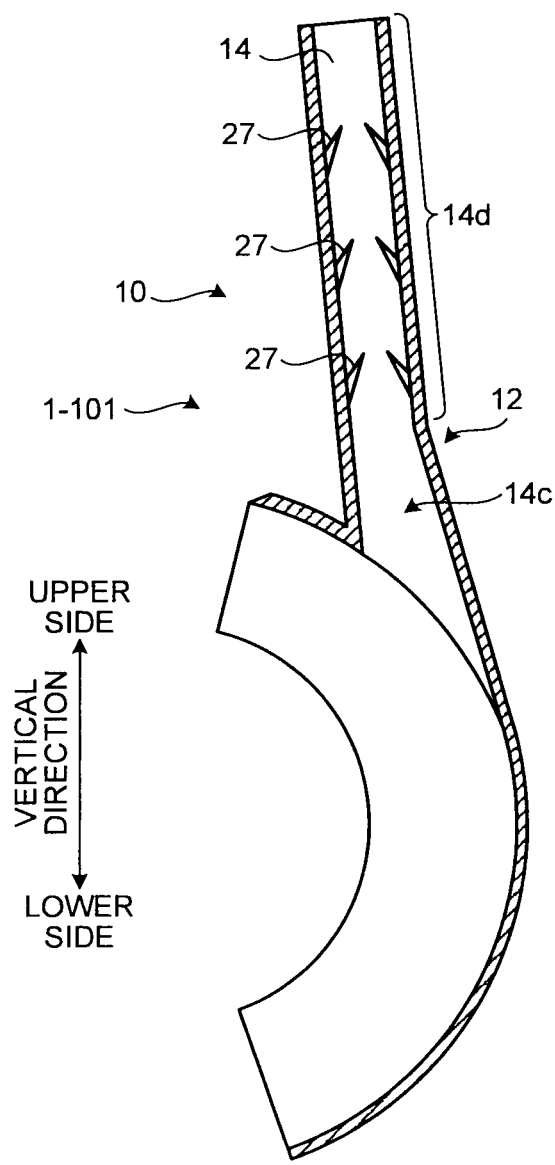
FIG. 16 is a front view illustrating a passage member according to a modification.

A modification of the tenth embodiment will be described. FIG. 16 is a front view illustrating the passage member 10 according to the modification. In a lubricant oil supplying apparatus 1-101 of the modification, the pulsation part 14d of the second passage 14 is provided with three check valves (backflow suppress structure) 27. The check valves 27 are disposed in positions different from each other in the vertical direction. The check valve 27 is a deformable valve member and is connected to the inner wall face of the second component part 12. The check valve 27 is inclined upward in the vertical direction to the center in the radial direction in the second passage 14, and can receive the lubricant oil which flows backward to the lower side in the vertical direction. The check valve 27 deforms and closes the second passage 14 when pressure (load) acts from above such as the case where the lubricant oil is received. When the pressure acts from below in the vertical direction, the check valve 27 opens the second passage 14. In such a manner, in a manner similar to the tenth embodiment, backflow and pulsation of the lubricant oil in the second passage 14 can be suppressed.

Eleventh Embodiment

Figure 17:
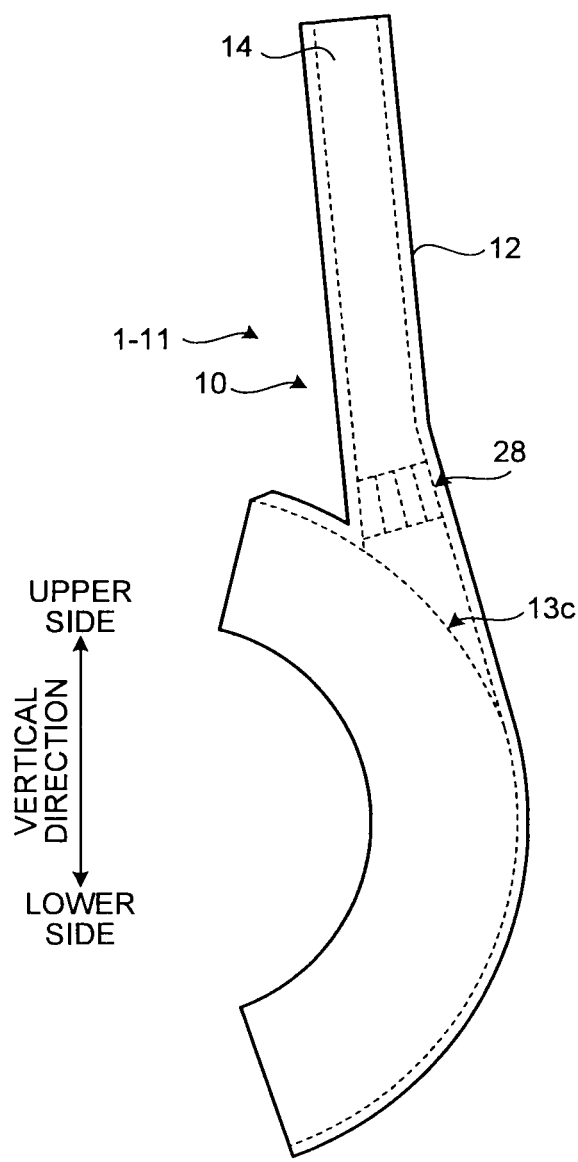
FIG. 17 is a front view illustrating a passage member of a lubricant oil supplying apparatus according to an eleventh embodiment.
Figure 18:
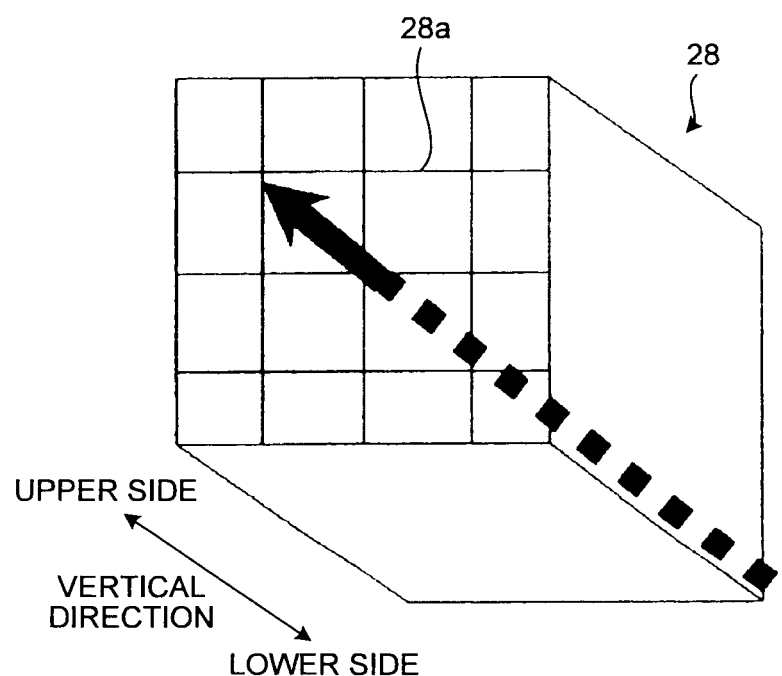
FIG. 18 is a perspective view illustrating a rectifier.

With reference to FIGS. 17 and 18, an eleventh embodiment will be described. In the eleventh embodiment, the same reference numerals are designated to members having functions similar to those described in the foregoing embodiments and repetitive description will not be given. FIG. 17 is a front view illustrating the passage member 10 of a lubricant oil supplying apparatus 1-11 according to the eleventh embodiment. FIG. 18 is a perspective view illustrating a rectifier.

The lubricant oil supplying apparatus 1-11 of the embodiment is different from the lubricant oil supplying apparatuses of the foregoing embodiments with respect to the point that a rectifier (rectifying member) 28 is provided in the second passage 14. The flow of the lubricant oil is rectified by the rectifier 28 and the flow of the lubricant oil becomes smooth, so that a larger amount of the lubricant oil can be fed to the oil receiving part 8 via the second passage 14. The connection part 13c is formed in a position opposed to the outer peripheral face of the differential ring gear 7.

As shown in FIG. 17, the rectifier 28 is provided in a lower part in the vertical direction in the second passage 14. The lubricant oil fed to the second passage 14 by rotation of the differential ring gear 7 flows through the rectifier 28 toward the oil receiving part 8. As shown in FIG. 18, the rectifier 28 is partitioned to a plurality of passages extending in the vertical direction by a lattice-shaped partition 28a. The lubricant oil which passes through the rectifier 28 flows in a plurality of passages each having a small passage sectional area, so that occurrence of an eddy is suppressed. Even in the case where the differential ring gear 7 is a helical gear and the lubricant oil is pushed obliquely and flows in the second passage 14, the flow direction of the lubricant oil is adjusted to the axial direction of the second passage 14, thereby suppressing occurrence of an eddy. Therefore, with the lubricant oil supplying apparatus 1-11, the performance of feeding the lubricant oil upward in the vertical direction improves.

The mounting position of the rectifier 28 in the second passage 14 is not limited to a lower part in the vertical direction. It is sufficient to mount the rectifier 28 in a position where the eddy tends to occur in the second passage 14. The shape of the partition 28a of the rectifier 28 is not limited to the lattice shape. The rectifier 28 has desirably a partition which can suppress flow of the lubricant oil in a direction orthogonal to the extending direction of the second passage 14. The rectifier 28 may have a configuration other than a partition as a configuration of suppressing occurrence of an eddy.

Twelfth Embodiment

Figure 19:
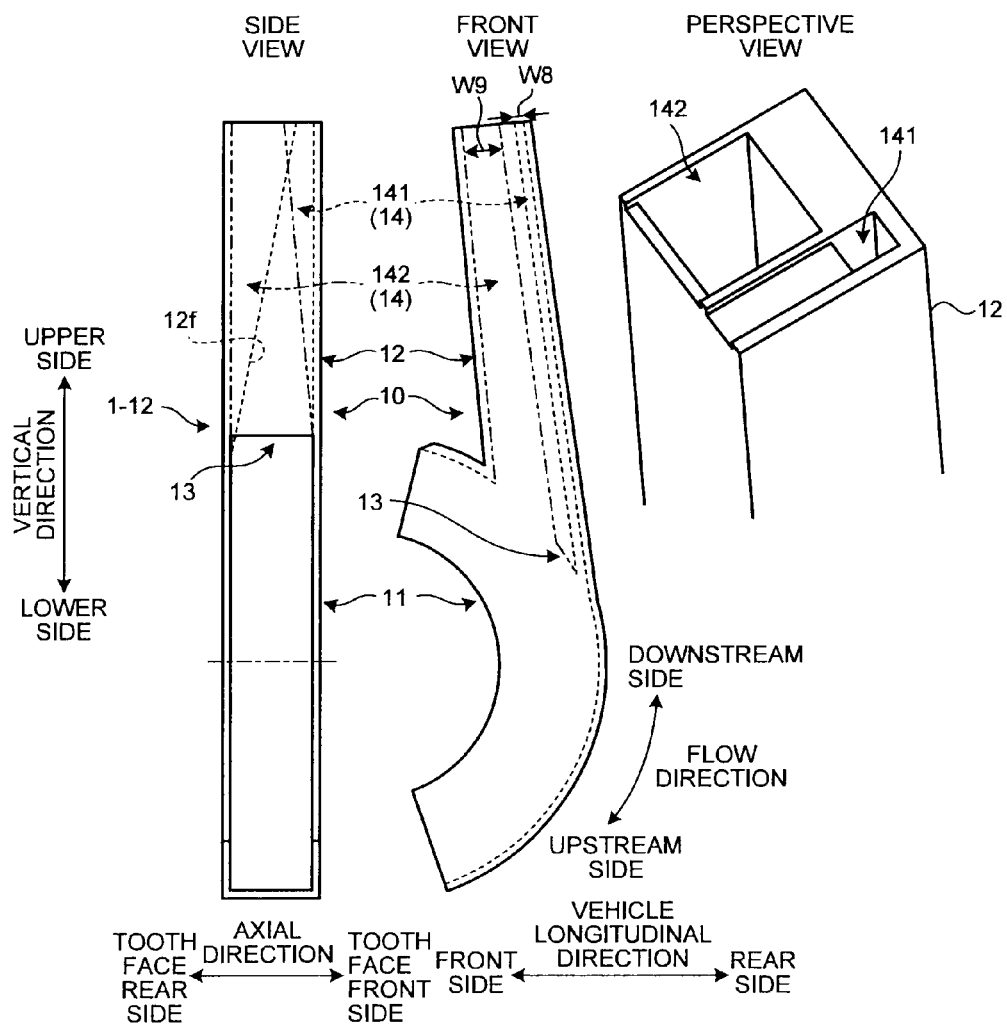
FIG. 19 is a front view, a side view, and a perspective view illustrating a passage member in a lubricant oil supplying apparatus according to a twelfth embodiment.
Figure 20:
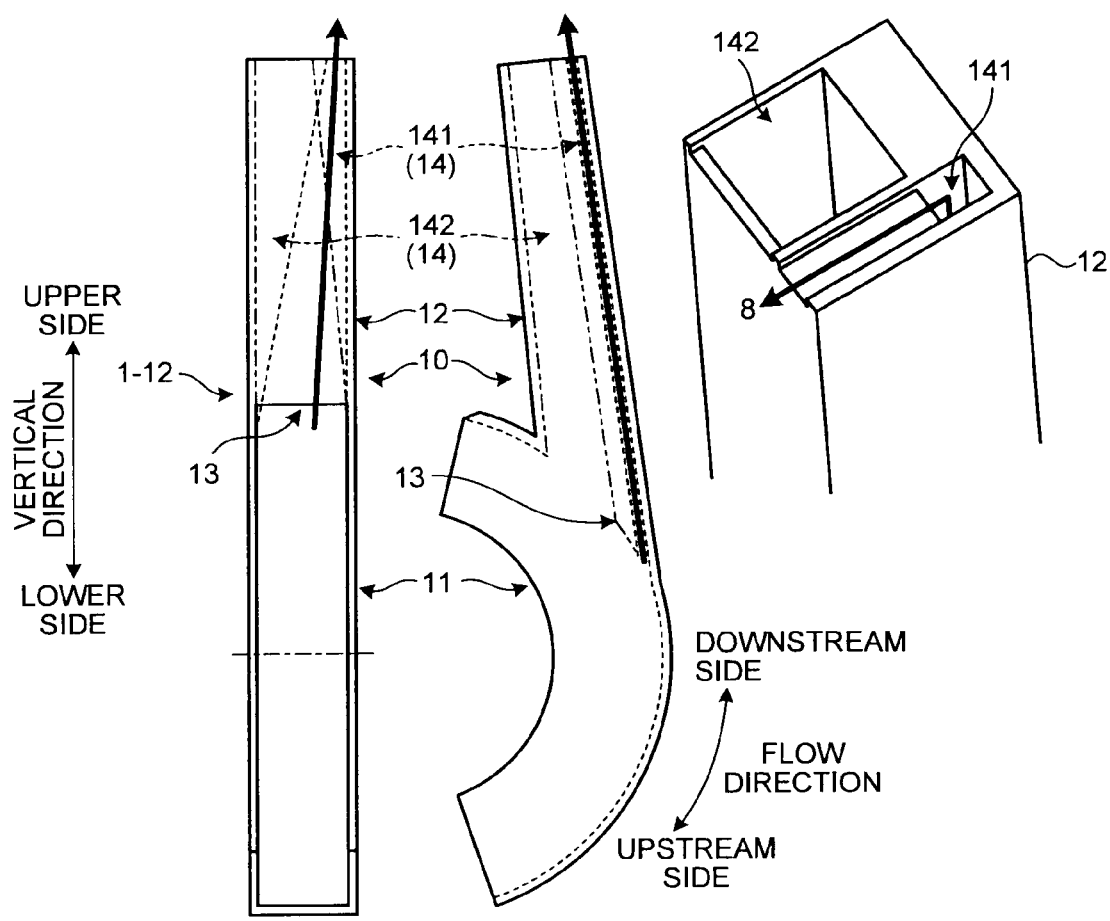
FIG. 20 is a diagram illustrating a flow of a lubricant oil at low vehicle speed.
Figure 21:
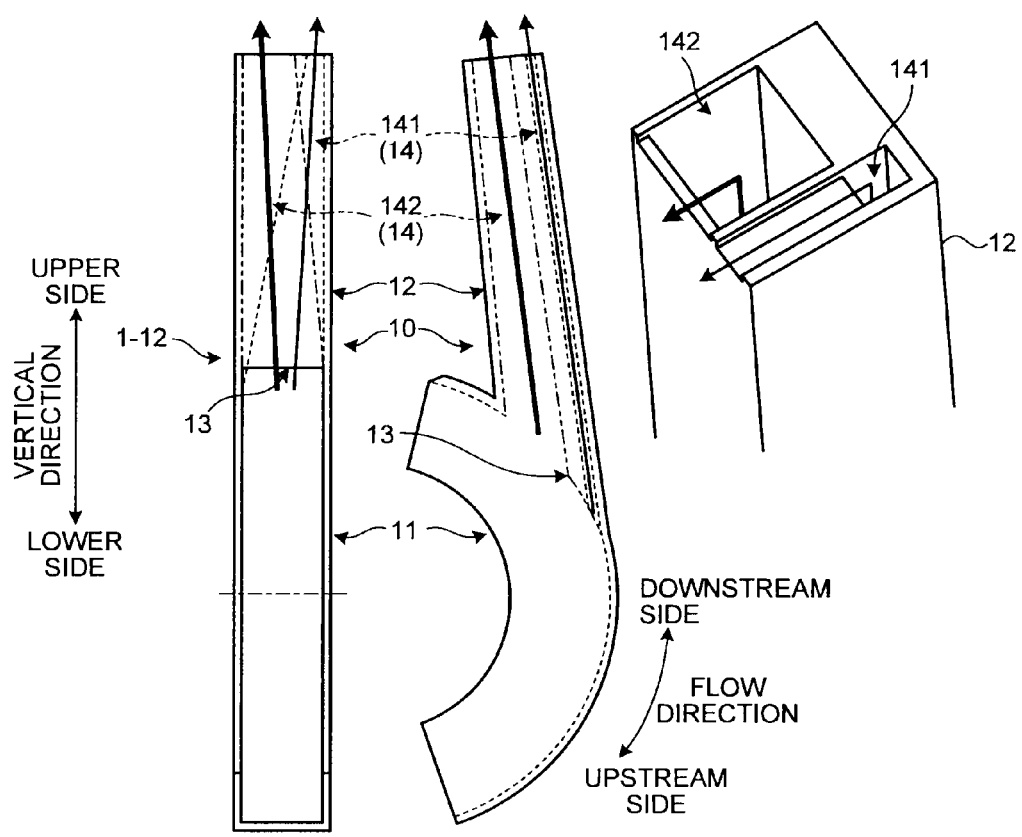
FIG. 21 is a diagram illustrating a flow of a lubricant oil at high vehicle speed.

With reference to FIGS. 19, 20, and 21, a twelfth embodiment will be described. In the twelfth embodiment, the same reference numerals are designated to members having functions similar to those described in the foregoing embodiments and repetitive description will not be given. FIG. 19 is a front view, a side view, and a perspective view illustrating the passage member 10 in a lubricant oil supplying apparatus 1-12 according to the twelfth embodiment. FIG. 20 is a diagram illustrating the flow of a lubricant oil at low vehicle speed. FIG. 21 is a diagram illustrating the flow of a lubricant oil at high vehicle speed.

The lubricant oil supplying apparatus 1-12 of the embodiment is different from the lubricant oil supplying apparatuses of the foregoing embodiments with respect to the point that the second passage 14 is divided into two paths: a path for low vehicle speed, and a path for high vehicle speed. When the vehicle speed is low, a necessary oil quantity is small and the force of the lubricant oil is small, so that the lubricant oil is raised by a narrow tube. In the case of using the narrow tube, since the weight of the lubricant oil is light, the lubricant oil easily rises. With the configuration, even when the vehicle speed is low, the lubricant oil is supplied to the oil receiving part 8. On the other hand, when the vehicle speed is high, necessary oil quant is larger. When only the narrow tube is used, the lubricant oil becomes insufficient at high vehicle speed, so that a path for high vehicle speed is provided separately from the path for low vehicle speed.

As shown in FIG. 19, in the second component part 12, a passage 141 for low vehicle speed and a passage 142 for high vehicle speed are formed as the second passage 14. The passage 141 for low vehicle speed and the passage 142 for high vehicle speed are passages independent of each other. The lower end of each of the passages is connected to the first passage 13 and the upper end is provided at the upper end of the second component part 12. Width W8 in the longitudinal direction of the vehicle in the passage 141 for low vehicle speed is smaller than width W9 in the longitudinal direction of the vehicle in the passage 142 for high vehicle speed. That is, a passage sectional area of the passage 141 for low vehicle speed is smaller than that of the passage 142 for high vehicle speed. In the tube having the small passage sectional area, since the weight of the lubricant oil on the upper side is light, the lubricant oil easily goes up in the tube. Consequently, even at the time of low vehicle speed when the force of the lubricant oil fed by the differential ring gear 7 is small, as shown in FIG. 20, the lubricant oil rises in the passage 141 for low vehicle speed having a small passage sectional area and is supplied to the oil receiving part 8. That is, the passage 141 for low vehicle speed is a passage for low speed in which the lubricant oil flows toward the oil receiving part 8 at least in the case where the rotational speed of the differential ring gear 7 is low.

The passage 141 for low vehicle speed has a tapered shape in which the passage sectional area on the upper side is smaller than that on the lower side in the vertical direction, and has a configuration that the lubricant oil easily rises to the oil receiving part 8 even when the vehicle speed is low. The wall face as a component of the passage 141 for low vehicle speed is inclined in correspondence with the flow direction of the lubricant oil fed by the differential ring gear 7. As shown in FIG. 19, in the second component part 12, an inner wall face 12f as a component of the passage 141 for low vehicle speed is inclined to the flow direction of the lubricant oil fed by the differential ring gear 7 in the axial direction. The inner wall face 12f is an inner wall face on the tooth face rear side as one of the inner wall faces opposed to each other in the axial direction, and is inclined to the tooth face front side toward the upper side in the vertical direction. Since the inner wall face 12f is inclined in such a manner, occurrence of an eddy in the passage 141 for low vehicle speed is suppressed, and the flow of the lubricant oil in the passage 141 for low vehicle speed becomes smooth.

When the vehicle speed is high, the force of the lubricant oil fed by the differential ring gear 7 is large, so that, as shown in FIG. 21, the lubricant oil rises not only in the passage 141 for low vehicle speed but also the passage 142 for high vehicle speed having large passage sectional area and is supplied to the oil receiving part 8. Therefore, a large amount of the lubricant oil is supplied to the oil receiving part 8 when the vehicle speed is high. The passage 142 for high vehicle speed is a passage for high speed in which the lubricant oil flows toward the oil receiving part 8 when the rotational speed of the differential ring gear 7 is high. As described above, in the lubricant oil supplying apparatus 1-12, by sending the lubricant oil using the paths which are different between the case where the vehicle speed is high and the case where the vehicle speed is low, the performance of feeding the lubricant oil upward in the vertical direction improves.

In the embodiment, the passage 141 for low vehicle speed is connected to the first passage 13 on the upstream side of the first passage 13 more than the passage 142 for high vehicle speed. With the configuration, the lubricant oil flowing in the first passage 13 by the rotation of the differential ring gear 7 preferentially flows in the passage 141 for low vehicle speed which opens in a position on the upstream side of the passage 142 for high vehicle speed. Therefore, when the vehicle speed is low, the lubricant oil is concentrated in the passage 141 for low vehicle speed, and it makes the lubricant oil easily rise to the oil receiving part 8.

Modification of Twelfth Embodiment

Figure 22:
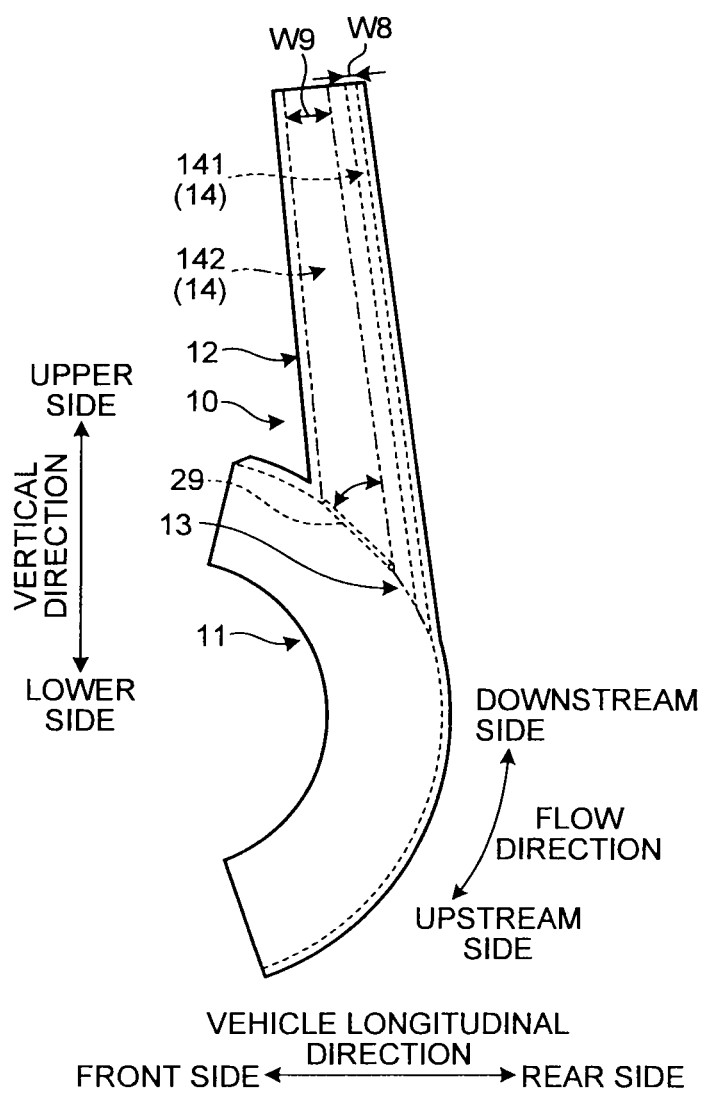
FIG. 22 is a front view illustrating a passage member according to a modification.

A modification of the twelfth embodiment will be described. FIG. 22 is a front view illustrating the passage member 10 according to a modification. As shown in FIG. 22, the passage 142 for high vehicle speed may be provided with an on-off valve 29 which is opened/closed by pressure. The on-off valve 29 opens the passage 142 for high vehicle speed when the pressure acting on the first passage 13 side is large, and closes the passage 142 for high vehicle speed when the pressure acting on the first passage 13 side is small. The on-off valve 29 is disposed in a lower part in the vertical direction in the passage 142 for high vehicle speed (for example, in the part of connection to the first passage 13). The characteristic of the on-off valve 29 is adjusted so as to close the passage 142 for high vehicle speed when the vehicle speed is low, and to open the passage 142 for high vehicle speed when the vehicle speed is high. It is sufficient to open the on-off valve 29, for example, when the pressure on the first passage 13 side is pressure sufficient to feed the lubricant oil to the oil receiving part 8 via the passage 142 for high vehicle speed.

Thirteenth Embodiment

Figure 23:
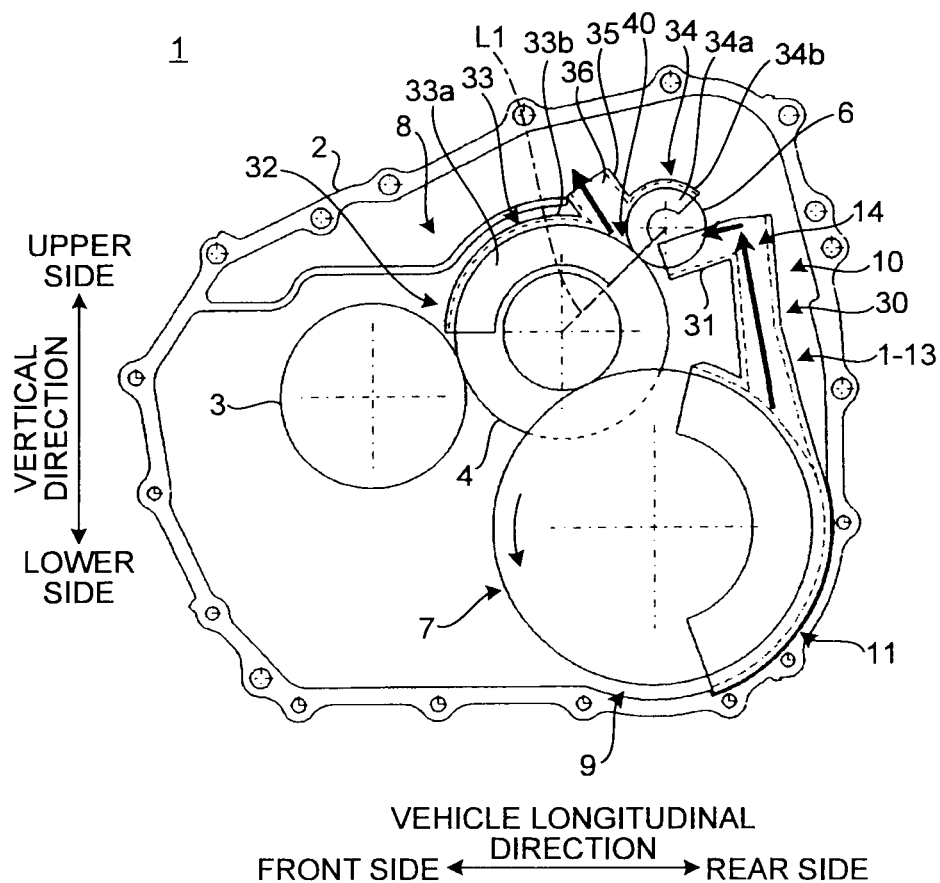
FIG. 23 is a front view illustrating a power transmission apparatus according to a thirteenth embodiment.

With reference to FIG. 23, a thirteenth embodiment will be described. In the thirteenth embodiment, the same reference numerals are designated to members having functions similar to those described in the foregoing embodiments and repetitive description will not be given. FIG. 23 is a front view illustrating a power transmission apparatus according to the thirteenth embodiment.

A lubricant oil supplying apparatus 1-13 of the embodiment is different from the lubricant oil supplying apparatuses of the foregoing embodiments with respect to the point that a mechanism for feeding the lubricant oil which flows out from the second passage 14 further upward is provided. With the configuration, even when the vehicle speed is low, the lubricant oil is fed to the oil receiving part 8 by the lubricant oil supplying apparatus 1-13.

As shown in FIG. 23, a guide passage 31 for guiding the lubricant oil to the MG2 reduction gear 6 is provided at the upper end in the vertical direction in the second component part 30 of the passage member 10. The guide passage 31 connects an opening on the upper side in the vertical direction in the second passage 14 and the lower part of the MG2 reduction gear 6. The second passage 14 opens upward in the vertical direction, and the lubricant oil which flows out from the second passage 14 and is guided to the MG2 reduction gear 6 via the guide passage 31 is adhered to the MG2 reduction gear 6 and sent in the rotation direction of the MG2 reduction gear 6.

The lubricant oil supplying apparatus 1-13 has an upper passage member 32. The upper passage member 32 serves as a passage of the lubricant oil to each of the counter driven gear 4 and the MG2 reduction gear 6, and guides the lubricant oil to the oil receiving part 8. The upper passage member 32 has a third component part 33 provided so as to face the counter driven gear 4 along the circumferential direction of the counter driven gear 4 and constructing a passage of the lubricant oil to the counter driven gear 4, a fourth component part 34 provided so as to face the MG2 reduction gear 6 along the circumferential direction of the MG2 reduction gear 6 and constructing a passage of the lubricant oil to the MG2 reduction gear 6, and a fifth component part 35 constructing a guide passage 36.

The third component part 33 has a pair of second side walls 33*a* opposed to each other while sandwiching the counter driven gear 4 in the axial direction and a second curved part 33*b* opposed to an outer peripheral face of the counter driven gear 4 in the radial direction and formed in a shape corresponding to the outer peripheral face of the counter driven gear 4.

The fourth component part 34 has a pair of third side walls 34*a* opposed to each other while sandwiching the MG2 reduction gear 6 in the axial direction and a third curved part 34*b* opposed to an outer peripheral face of the MG2 reduction gear 6 in the radial direction and formed in a shape corresponding to the outer peripheral face of the MG2 reduction gear 6. The third and fourth component parts 33 and 34 cover a part on the upper side in the vertical direction (the oil receiving part 8 side) of an imaginary line L1 connecting the center axis of the counter driven gear 4 and the center axis of the MG2 reduction gear 6.

The second side walls 33*a* and the third side walls 34*a* are connected to each other, formed as an integral wall and sandwich an engagement part 40 between the counter driven gear 4 and the MG2 reduction gear 6 in the axial direction. The fifth component part 35 is formed in a chimney shape having a rectangular shape in section and is connected to the second curved part 33*b* and the third curved part 34*b*. The lower end of the fifth component part 35 is open toward the engagement part 40, and the upper end is open to the oil receiving part 8. That is, The guide passage 36 connects the oil receiving part 8 and the space between the counter driven gear 4 and the MG2 reduction gear 6 on the upper side in the vertical direction of the engagement part 40.

The counter driven gear 4 and the MG2 reduction gear 6 rotate in the direction that the upper parts in the vertical direction of the imaginary line L1 connecting the center axes of the gears come closer to each other. The lubricant oil adhered to the counter driven gear 4 and the MG2 reduction gear 6 (the lubricant oil filling between the teeth) is concentrated in the engagement part 40 by the rotation, and is pushed out by the engagement between the counter driven gear 4 and the MG2 reduction gear 6 in the engagement part 40. Since the flow of the lubricant oil to the axial direction from the engagement part 40 is regulated by the second side walls 33*a* and the third side walls 34*a*, the lubricant oil pushed out by the engagement flows upward in the vertical direction and flows in the oil receiving part 8 via the guide passage 36.

As described above, with the lubricant oil supplying apparatus 1-13 of the embodiment, the lubricant oil is fed by using not only the rotation energy of the differential ring gear 7 (the force and the pressure of the pump effect) but also the engagement between the counter driven gear 4 and the MG2 reduction gear 6. Therefore, even when the vehicle speed is low, the lubricant oil can be supplied to the oil receiving part 8. Even in the case where the different in height in the vertical direction between the differential ring gear 7 and the oil receiving part 8 is large, a sufficient amount of the lubricant oil is supplied to the oil receiving part 8. That is, with the lubricant oil supplying apparatus 1-13, the performance of feeding the lubricant oil upward in the vertical direction improves.

When the vehicle speed becomes high, the force of the lubricating oil which flows out from the second passage 14 upward in the vertical direction is large, so that the lubricant oil jumping from the second passage 14 can directly flow in the oil receiving part 8 not via the passage formed by the upper passage member 32.

Preferably, the upper configuration member 32 is constructed as follows.

The upper configuration member 32 does not have to have the second curved part 33*b* and the third curved part 34*b* but, from the viewpoint of suppressing the splash of the lubricant oil adhered to the drive pinion gear 5 and the MG2 reduction gear 6 due to the rotation, it is preferable to provide the second curved part 33*b* and the third curved part 34*b*.

From the viewpoint of suppressing push-out in the axial direction of the lubricant oil from the engagement part 40, preferably, the second side wall 33*a* and the third side wall 34*a* have a shape sandwiching at least the engagement part 40 in the axial direction.

Fourteenth Embodiment

Figure 24:
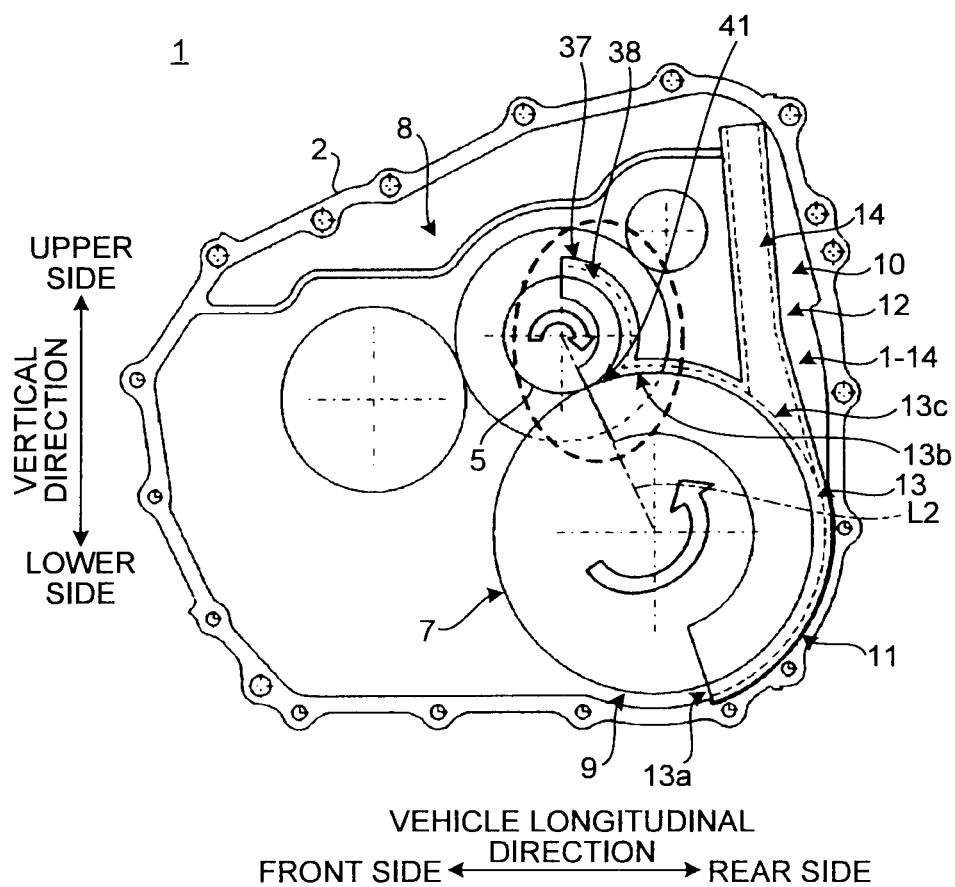
FIG. 24 is a front view illustrating a power transmission apparatus according to a fourteenth embodiment.
Figure 25:
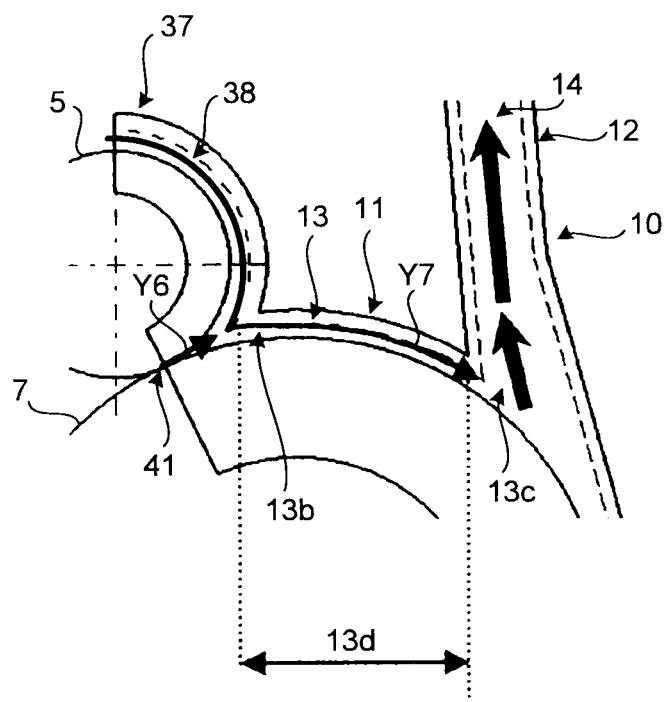
FIG. 25 is an enlarged view illustrating a main part of a lubricant oil supplying apparatus according to the fourteenth embodiment.

With reference to FIGS. 24 and 25, a fourteenth embodiment will be described. In the fourteenth embodiment, the same reference numerals are designated to members having functions similar to those described in the foregoing embodiments and repetitive description will not be given. FIG. 24 is a front view illustrating a power transmission apparatus according to the fourteenth embodiment. FIG. 25 is an enlarged view illustrating a main part of a lubricant oil supplying apparatus according to the fourteenth embodiment.

A lubricant oil supplying apparatus 1-14 of the embodiment is different from the lubricant oil supplying apparatuses of the foregoing embodiments with respect to the point that flow of the lubricant oil from the connection part 13*c* to the outflow port 13*b* is suppressed by the pressure of the lubricant oil pushed out by engagement of the differential ring gear 7 and the drive pinion gear (predetermined rotating member) 5.

As shown in FIG. 24, the passage member 10 of the embodiment has a sixth component part 37. The sixth component part 37 is connected to the first component part 11 at the end on the downstream side of the first passage 13. The sixth component part 37 is provided opposed to the drive pinion gear 5 along the circumferential direction of the drive pinion gear 5, and forms a passage of the lubricant oil between the drive pinion gear 5 and itself. The sixth component part 37 extends in a direction opposite to the rotation direction of the drive pinion gear 5 from the connection part to the first component part 11. The sixth component part 37 is opposed to both side faces and the outer peripheral face of the drive pinion gear 5 and forms a pinion-side passage 38 between the drive pinion gear 5 and itself. The pinion-side passage 38 is connected to the outflow port 13*b* as the end on the downstream side of the first passage 13. The first component part 11 and the sixth component part 37 sandwich an engagement part 41 between the differential ring gear 7 and the drive pinion gear 5 in the axial direction, thereby regulating outflow of the lubricant oil in the axial direction from the engagement part 41. That is, the outflow port 13*b* is connected to the engagement part 41 by an oil path formed by the passage member 10.

The differential ring gear 7 and the drive pinion gear 5 rotate in the direction of approaching each other on the connection part 13*c* side more than the imaginary line L2 connecting the center axes of the gears. The lubricant oil adhered to the differential ring gear 7 and the drive pinion gear 5 (the lubricant oil filling between the teeth) is pushed out by the engagement between the differential ring gear 7 and the drive pinion gear 5 in the engagement part 41. Since the flow of the lubricant oil to the axial direction from the engagement part 41 is regulated by the first component part 11 and the sixth component part 37, the lubricant oil is pushed back from the engagement part 41 to the first passage 13 and the pinion-side passage 38 as shown by arrow Y6 in FIG. 25. Accompanying the rotation of the drive pinion gear 5, the lubricant oil flows in the engagement part 41 continuously via the pinion-side passage 38. As a result, the oil pressure in the connection part between the first passage 13 and the pinion-side passage 38 increases. Consequently, as shown by arrow Y7, the lubricant oil flows backward in an interval 13d between the connection part 13c in the first passage 13 and the outflow port 13b, and the wall of the lubricant oil is formed in the connection part 13c. As a result, the lubricant oil which flows through the first passage 13 from the inflow port 13a to the connection part 13c is blocked by the wall of the lubricant oil and flows to the second passage 14. That is, with the lubricant oil supplying apparatus 1-14, flow of the lubricant oil from the connection part 13c toward the outflow port 13b is suppressed, the flow of the lubricant oil from the first passage 13 toward the oil receiving part 8 via the second passage 14 is promoted, and the performance of feeding the lubricant oil upward in the vertical direction improves. The suppression structure of the embodiment includes the passage member 10, the differential ring gear 7, and the drive pinion gear 5.

Fifteenth Embodiment

Figure 26:
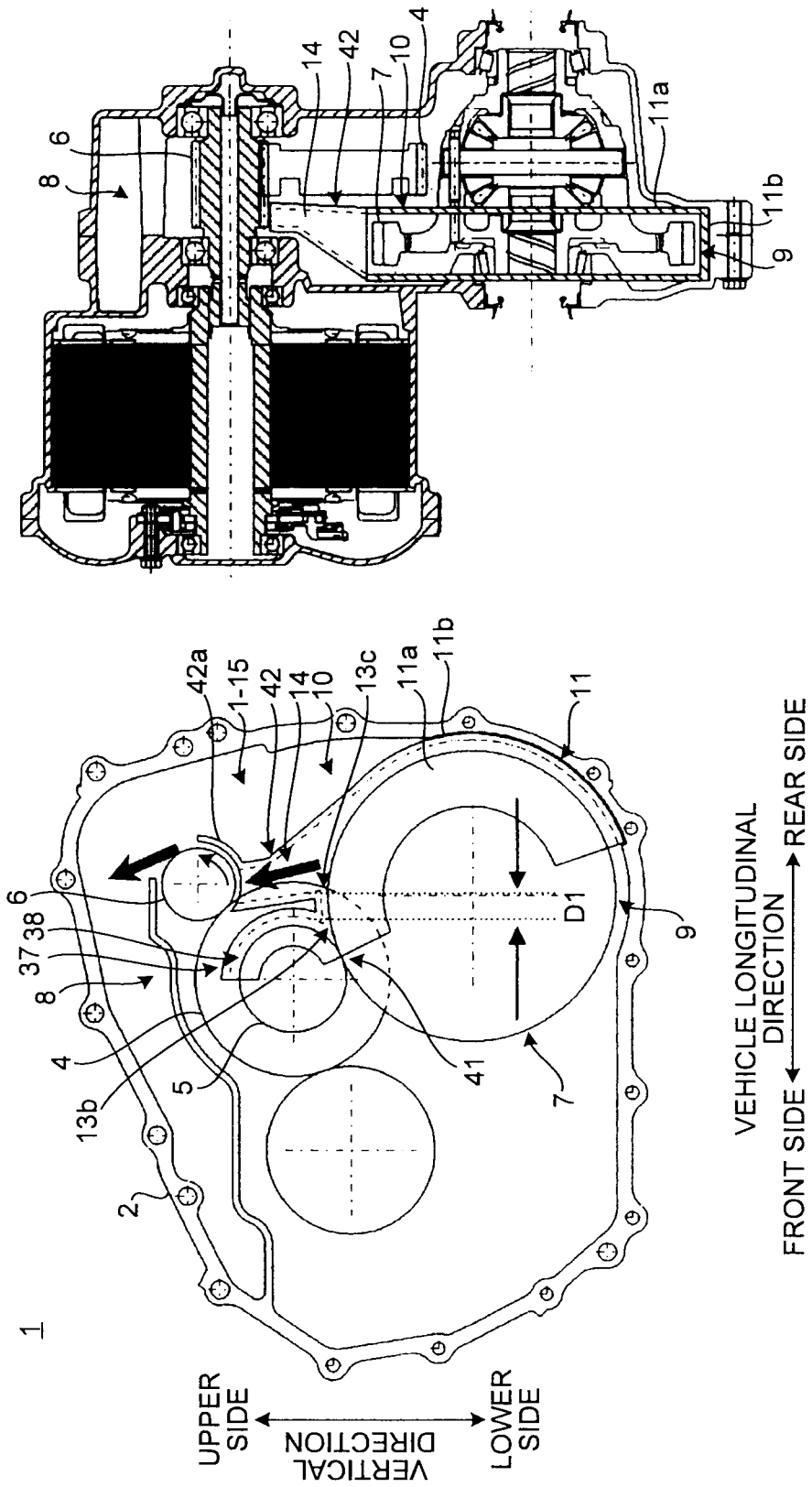
FIG. 26 is a front view and a cross sectional view illustrating a power transmission apparatus according to a fifteenth embodiment.

With reference to FIG. 26, a fifteenth embodiment will be described. In the fifteenth embodiment, the same reference numerals are designated to members having functions similar to those described in the foregoing embodiments and repetitive description will not be given. FIG. 26 is a front view and a cross sectional view illustrating a power transmission apparatus according to the fifteenth embodiment.

A lubricant oil supplying apparatus 1-15 of the embodiment is different from the lubricant oil supplying apparatuses of the foregoing embodiments with respect to the point that the lubricant oil passed upward along the second passage 14 is fed to the oil receiving part 8 by rotation of the MG2 reduction gear 6.

In the lubricant oil supplying apparatus 1-14 of the fourteenth embodiment (FIGS. 24 and 25), when the interval 13d between the connection part 13c in the first passage 13 and the outflow port 13b is long, backward flow to the connection part 13c of the lubricant oil pushed out by the engagement between the drive pinion gear 5 and the differential ring gear 7 is suppressed, and an effect of suppressing the flow of the lubricant oil from the connection part 13c toward the outflow port 13b is not easily produced. On the other hand, when the length of the interval 13d is reduced, the second component part 12 is set near to the drive pinion gear 5, and the MG2 reduction gear 6 becomes an obstacle. The MG2 reduction gear 6 and the second component part 12 interfere each other, and the second passage 14 cannot be extended upward to the inlet of the oil receiving part 8.

In the lubricant oil supplying apparatus 1-15 of the embodiment, the second passage 14 extends from the connection part 13c to the MG2 reduction gear 6, and the lubricant oil raised via the second passage 14 is fed to the oil receiving part 8 by the feed-up force generated by the rotation of the MG2 reduction gear 6. The sixth component part 37 similar to that in the fourteenth embodiment is provided, and the pinion-side passage 38 is formed between the sixth component part 37 and the drive pinion gear 5. A second component part 42 is disposed closer to the drive pinion gear 5 so that distance D1 between the connection part 13c in the first passage 13 and the outflow port 13b becomes shorter. The connection part 13c is positioned below the MG2 reduction gear 6 in the vertical direction. The second component part 42 is formed in a rectangular chimney shape in section and vertically extends from the connection part 13c to the MG2 reduction gear 6. The opening on the upper side in the vertical direction of the second component part 42 faces the outer peripheral face of the MG2 reduction gear 6. At the end on the upper side in the vertical direction of the second component part 42, a guide part 42a is provided. The guide part 42a faces the outer peripheral face of the MG2 reduction gear 6 and extends in the circumferential direction from the upper end of the second component part 42 along the rotation direction of the MG2 reduction gear 6. The lubricant oil which flows out from the second passage 14 toward the MG2 reduction gear 6 passes through a passage formed between the MG2 reduction gear 6 and the guide part 42a by the rotation of the MG2 reduction gear 6 and is sent to the oil receiving part 8.

As described above, with the lubricant oil supplying apparatus 1-15 of the embodiment, the flow of the lubricant oil from the connection part 13c toward the outflow port 13b is suppressed more reliably and the lubricant oil is sent to the oil receiving part 8 by using not only the rotation of the differential ring gear 7 but also the rotation of the MG2 reduction gear 6. Consequently, even when the vehicle speed is low or even in the case where the difference in height between the differential ring gear 7 and the oil receiving part 8 is large, the lubricant oil is supplied to the oil receiving part 8. That is, the performance of feeding the lubricant oil upward in the vertical direction improves.

Modification of Fifteenth Embodiment

Figure 27:
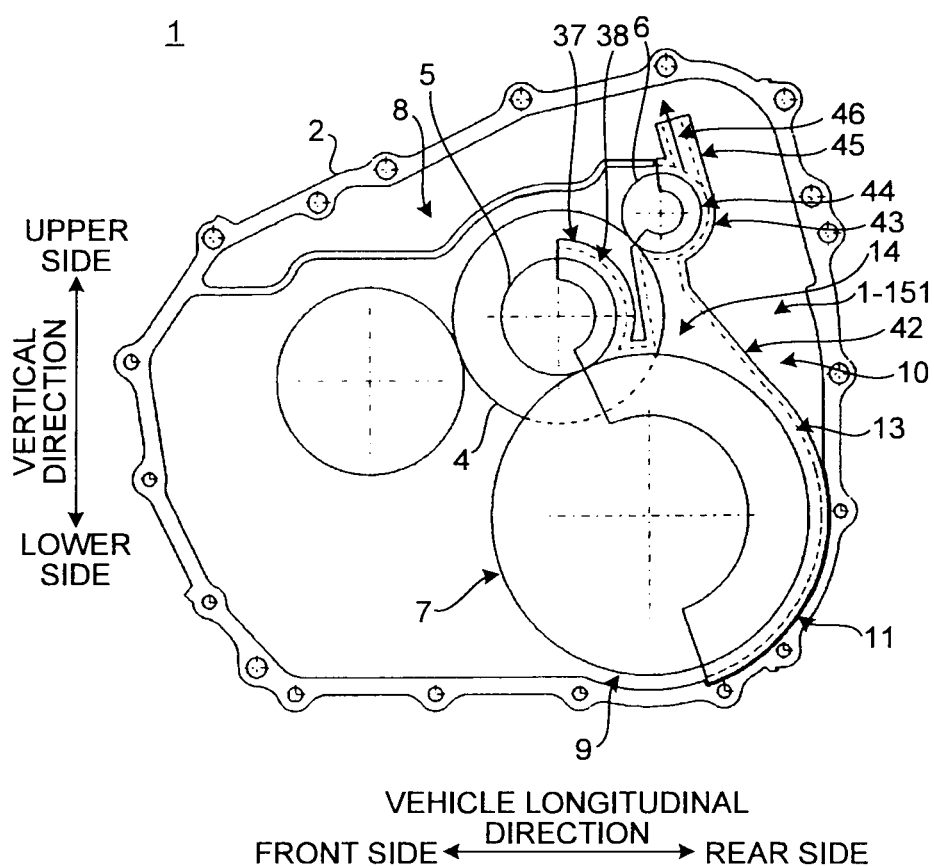
FIG. 27 is a front view illustrating a power transmission apparatus according to a modification.

Referring to FIG. 27, a modification of the fifteenth embodiment will be described. In a lubricant oil supplying apparatus 1-151 of the modification, a first upper passage and a second upper passage for guiding the lubricant oil fed by the rotation of the MG2 reduction gear 6 to the oil receiving part 8 are provided. With the configuration, the lubricant oil can be efficiently fed to the oil receiving part 8 by the MG2 reduction gear 6.

FIG. 27 is a front view illustrating a power transmission apparatus according to the modification. As shown in FIG. 27, in the passage member 10 of the modification, a seventh component part 43 and an eighth component part 45 are provided in place of the guide part 42a of the fifteenth embodiment. The seventh component part 43 is provided so as to face the MG2 reduction gear 6 along the circumferential direction of the MG2 reduction gear 6, and forms a first upper passage 44 as a passage of the lubricant oil to the MG2 reduction gear 6. The seventh component part 43 is connected to the upper end of the second component part 42, and extends in the circumferential direction along the rotation direction of the MG2 reduction gear 6. The seventh component part 43 faces both side faces and the external peripheral face of the MG2 reduction gear 6. The eighth component part 45 is formed in a rectangular chimney shape in section and has therein a second upper passage 46. The second upper passage 46 is connected to the first upper passage 44 and guides the lubricant oil in the first upper passage 44 to the oil receiving part 8. The lower end of the second upper passage 46 is connected to the first upper passage 44, and the upper end is directed to the oil receiving part 8.

The lubricant oil sent to the MG2 reduction gear 6 via the second passage 14 by the rotation of the differential ring gear 7 is sent via the first upper passage 44 and the second upper passage 46 to the oil receiving part 8 by the pump effect produced by the MG2 reduction gear 6 and the seventh component part 43 in addition to the force of rotation of the MG2 reduction gear 6. By providing the second upper passage 46, splash of the lubricant oil sent by the MG2 reduction gear 6 toward a direction different from the oil receiving part 8 is suppressed.

Sixteenth Embodiment

Figure 28:
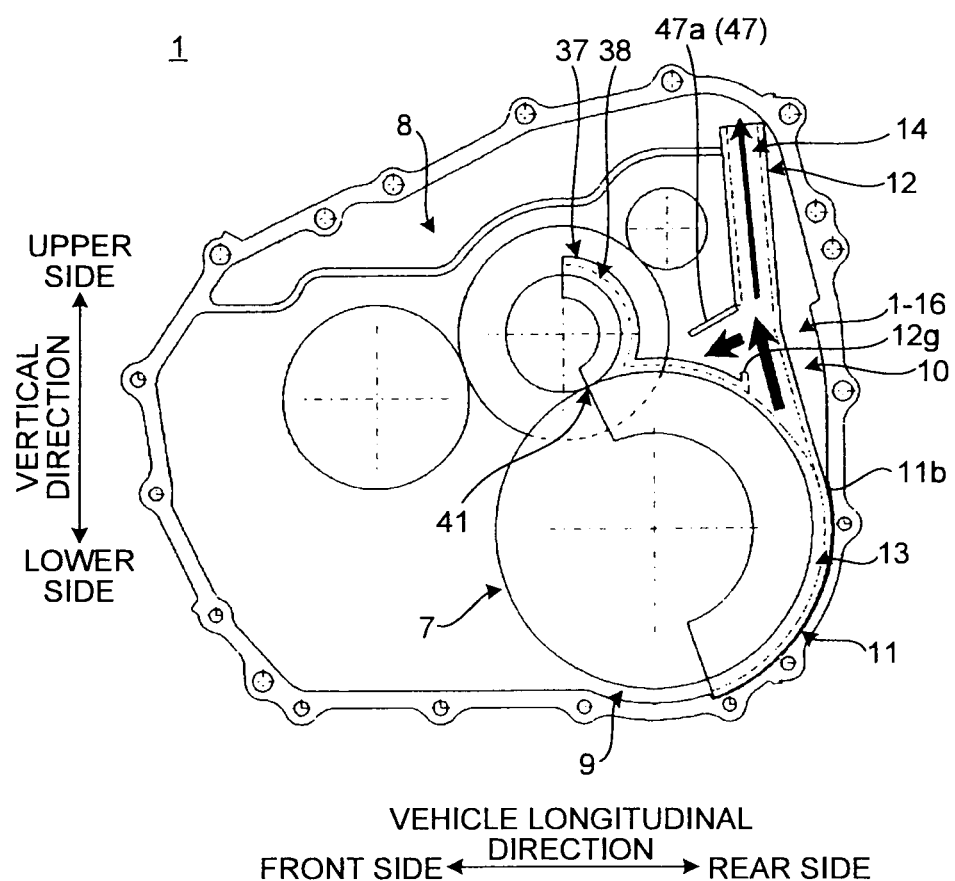
FIG. 28 is a front view illustrating a power transmission apparatus according to a sixteenth embodiment.

With reference to FIG. 28, a sixteenth embodiment will be described. In the sixteenth embodiment, the same reference numerals are designated to members having functions similar to those described in the foregoing embodiments and repetitive description will not be given. FIG. 28 is a front view illustrating a power transmission apparatus according to the sixteenth embodiment.

A lubricant oil supplying apparatus 1-16 of the embodiment is different from the lubricant oil supplying apparatus 1-14 (FIG. 24) of the fourteenth embodiment with respect to the point that an exhaust valve for exhausting the lubricant oil in the second passage 14 to the outside in accordance with pressure is provided. When the vehicle speed becomes high and the hydraulic pressure becomes high, the exhaust valve is open to exhaust the lubricant oil in the second passage 14. Consequently, rise in the hydraulic pressure in the engagement part 41 is suppressed, and increase in the drag torque is suppressed.

As shown in FIG. 28, in the lubricant oil supplying apparatus 1-16 of the embodiment, the second component part 12 is provided with an exhaust valve 47. In a wall face on the front side in the vehicle longitudinal direction in the second component part 12, an opening (window) 12g is formed. The exhaust valve 47 has a valve member 47a capable of closing the opening 12g, and opens/closes the opening 12g. The valve member 47a is coupled to the second component part 12 by a hinge or the like and can open to the outside by the pressure in the second passage 14 from a state where it is in contact with the second component part 12 and closes the opening 12g. The valve member 47a is pressed against the second passage 14 by energizing means such as a spring, when the pressure in the second passage 14 becomes equal to or larger than predetermined pressure, is opened against the energization force of the energizing means, and opens the opening 12g. When the vehicle speed is low, the pressure in the second passage 14 is low, so that the exhaust valve 47 is closed. When the vehicle speed is high, the pressure in the second passage 14 becomes high, the exhaust valve 47 opens, and the lubricant oil in the second passage 14 is exhausted to the outside. That is, the exhaust valve 47 is a mechanism for allowing the lubricating oil in the second passage 14 to escape to the outside in accordance with the pressure in the second passage 14. With the configuration, excessive rise in the hydraulic pressure in the engagement part 41 is suppressed, and deterioration and the like in the transmission efficiency due to increase in drag torque is suppressed.

In the embodiment, the opening 12g is provided in a position above the curved part 11b in the first component part 11 in the vertical direction. Therefore, the lubricant oil exhausted from the second passage 14 via the opening 12g temporarily remains on the curved part 11b (the outer peripheral face of the first component part 11), and the lubricant oil overflowed from the curved part 11b drops on the accumulating part 9. As described above, by accumulating the lubricant oil on the first component part 11, the oil level in the accumulating part 9 decreases when the vehicle speed is high, and agitation resistance of the differential ring gear 7 is reduced. As a result, the lubricant oil supplying apparatus 1-16 of the embodiment produces an effect such that the transmission efficiency of the power transmission apparatus 1 improves.

The exhaust valve 47 may allow the lubricating oil in the first passage 13 to escape to the outside in accordance with the pressure in the first passage 13. Each of the first and second passages 13 and 14 may be provided with the exhaust valve 47.

Seventeenth Embodiment

Figure 29:
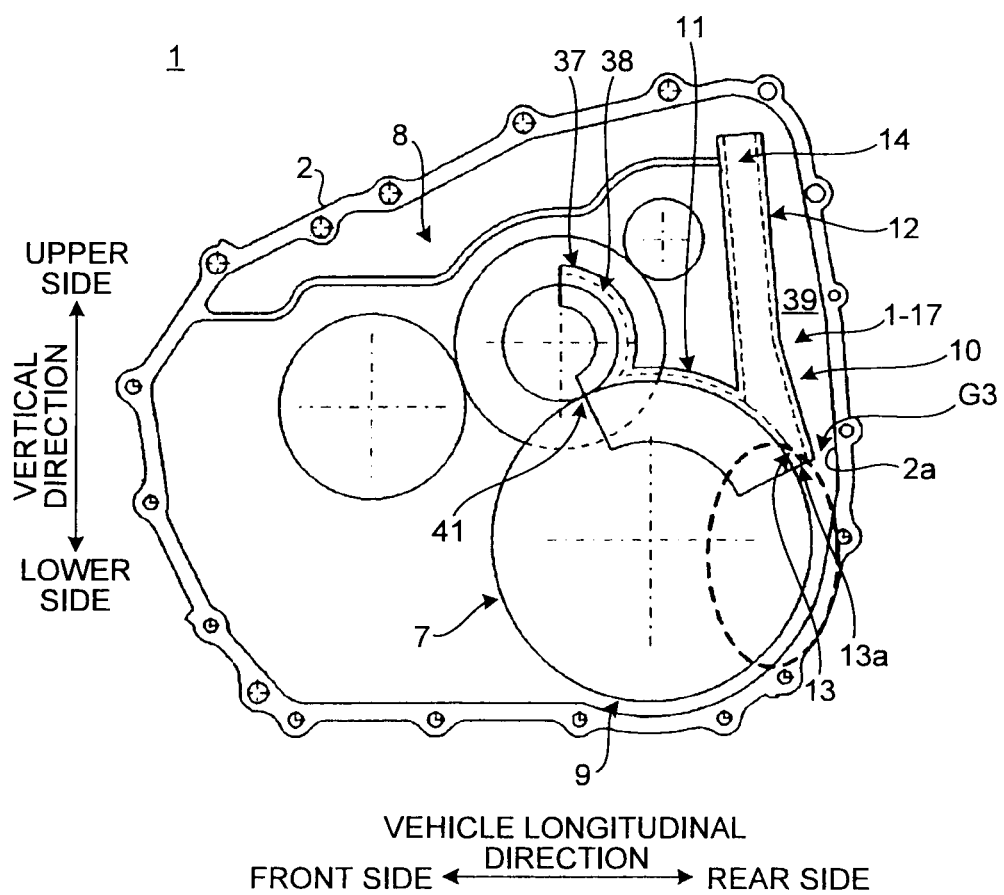
FIG. 29 is a front view illustrating a power transmission apparatus according to a seventeenth embodiment.
Figure 30:
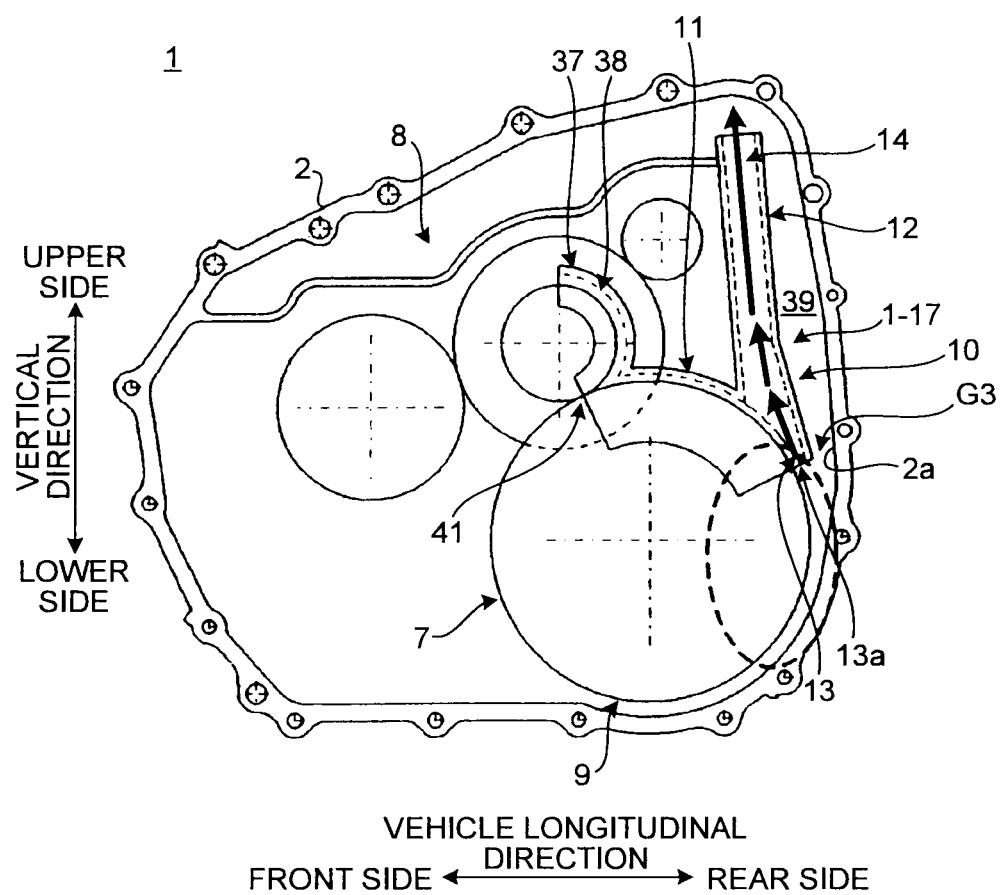
FIG. 30 is a diagram illustrating a flow of a lubricant oil at low-speed travel.
Figure 31:
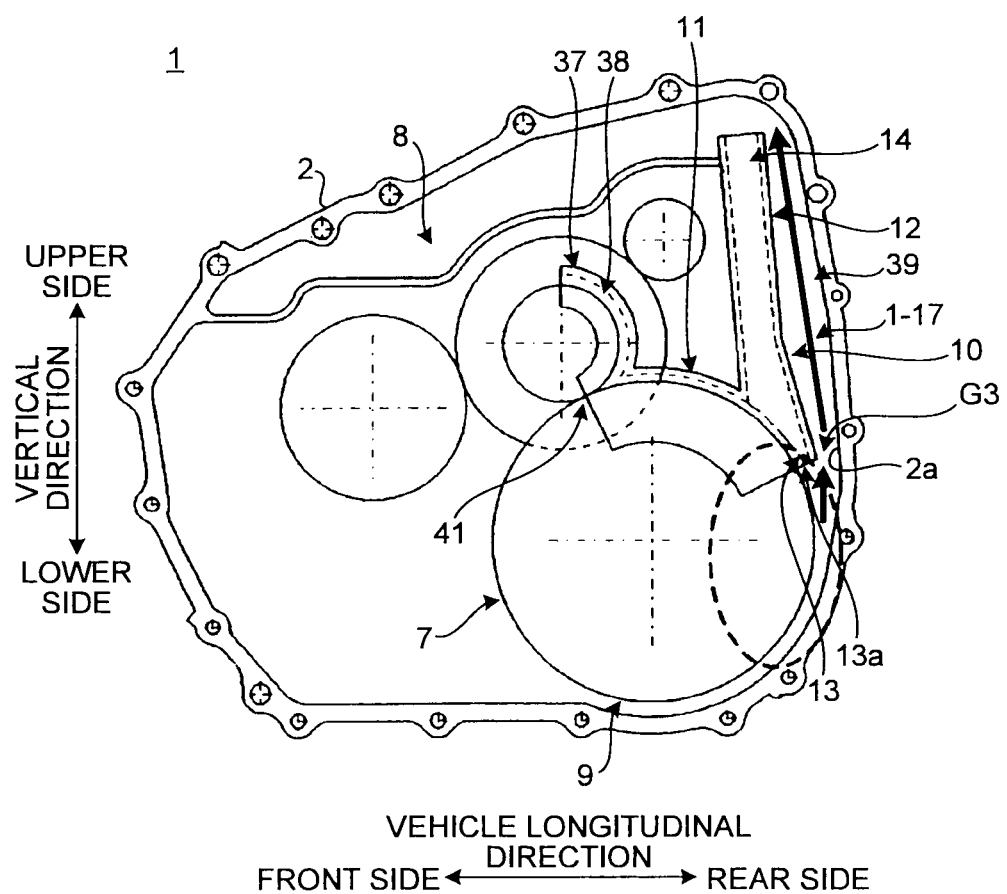
FIG. 31 is a diagram illustrating a flow of a lubricant oil at high-speed travel.

With reference to FIGS. 29 to 31, a seventeenth embodiment will be described. In the seventeenth embodiment, the same reference numerals are designated to members having functions similar to those described in the foregoing embodiments and repetitive description will not be given. FIG. 29 is a front view illustrating a power transmission apparatus according to the seventeenth embodiment. FIG. 30 is a diagram illustrating the flow of the lubricant oil at low-speed travel. FIG. 31 is a diagram illustrating the flow of the lubricant oil at high-speed travel.

A lubricant oil supplying apparatus 1-17 of the embodiment is different from the lubricant oil supplying apparatus 1-14 of the fourteenth embodiment with respect to the point that the passage member 10 is constructed so as to feed the lubricating oil to the oil receiving part 8 not through the first and second passages 13 and 14 when the vehicle speed is high. When the vehicle speed is high, the lubricant oil passes on the outside of the first and second passages 13 and 14, thereby suppressing rise in the hydraulic pressure in the engagement part 41 and reducing the drag torque.

As shown in FIG. 29, in the lubricant oil supplying apparatus 1-17 of the embodiment, the lower end of the passage member 10 is positioned above the lower end of the passage member 10 of the fourteenth embodiment in the vertical direction. On the outside in the radial direction of the differential ring gear 7 than the first and second passages 13 and 14, the outer peripheral face of the passage member 10 and an inner peripheral face 2a of the case 2 are apart from each other, and a third passage 39 in which the lubricant oil can be distributed is formed between the passage member 10 and the inner peripheral face 2a of the case 2. On the rear side in the vehicle longitudinal direction of the inflow port 13a, a space G3 is formed between the passage member 10 and the inner peripheral face 2a of the case 2.

When the vehicle speed is low, the lubricant oil sticks to the differential ring gear 7 due to its viscosity. Consequently, as shown in FIG. 30, the lubricant oil flows from the inflow port 13a into the first passage 13 by the rotation of the differential ring gear 7 and flows in the oil receiving part 8 via the second passage 14.

On the other hand, when the vehicle speed is high, the lubricant oil is apart from the differential ring gear 7 by the centrifugal force and rises along the inner wall face 2a of the case 2. That is, when the rotational speed of the differential ring gear 7 is high, as shown in FIG. 31, the lubricant oil apart from the differential ring gear 7 passes through the gap G3, rises on the outside of the first and second passages 13 and 14, passes through the third passage 39, and moves toward the oil receiving part 8.

As described above, with the lubricant oil supplying apparatus 1-17 of the embodiment, without requiring a complicated configuration such as a switching mechanism, switching of the paths of the lubricant oil in accordance with the flow velocity is realized. Since the centrifugal force and the viscosity of the lubricant oil are used, the structure of the passage member 10 can be made simple. It is sufficient to set the position of the inflow port 13a, for example, on the basis of the position at which the lubricant oil is apart from the differential ring gear 7 by centrifugal force at predetermined high vehicle speed. The position of the inflow port 13*a* can be set to, for example, a position above in the vertical direction of the center axis of the differential ring gear 7.

Eighteenth Embodiment

Figure 32:
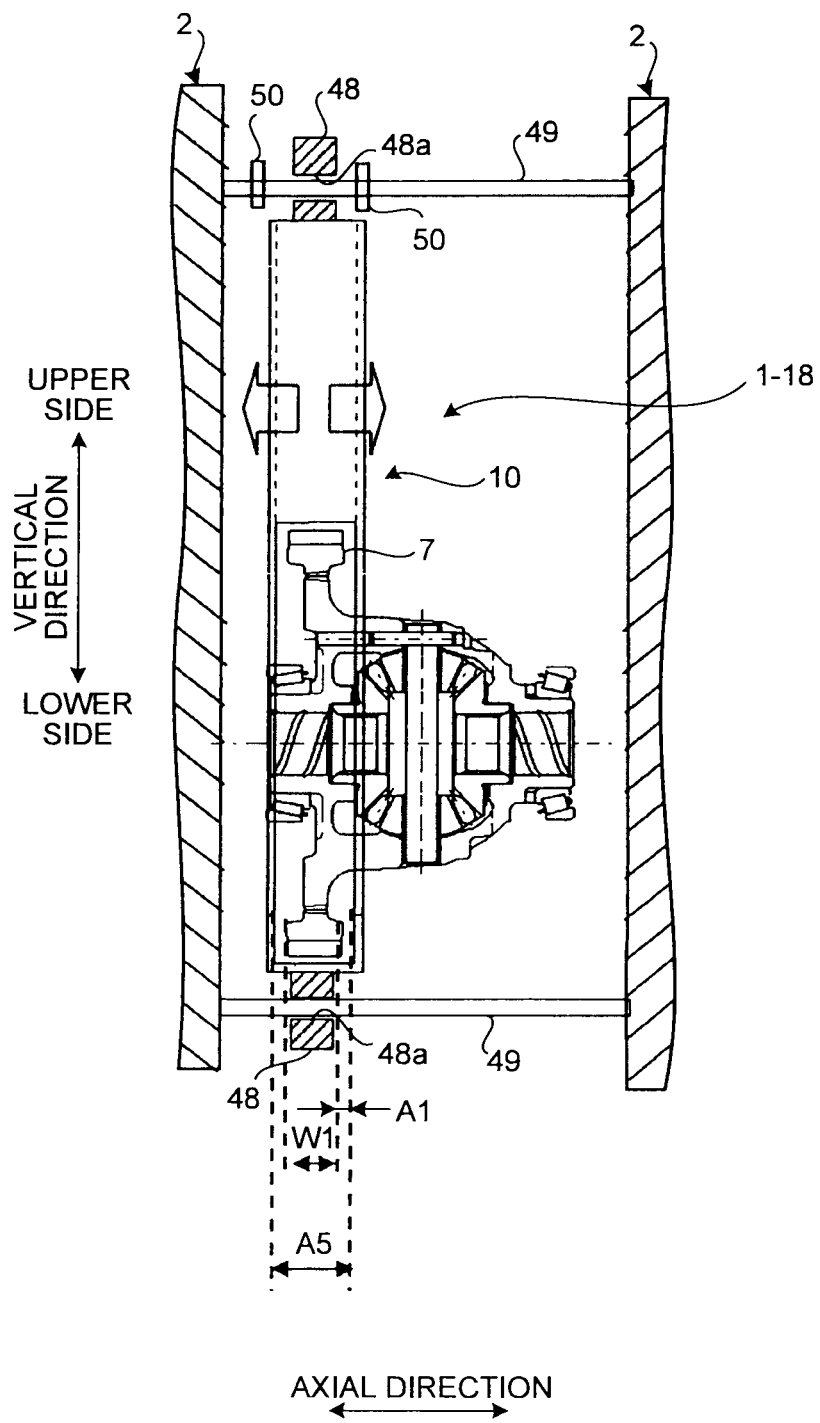
FIG. 32 is a diagram illustrating a method of supporting a passage member according to an eighteenth embodiment.
Figure 33:
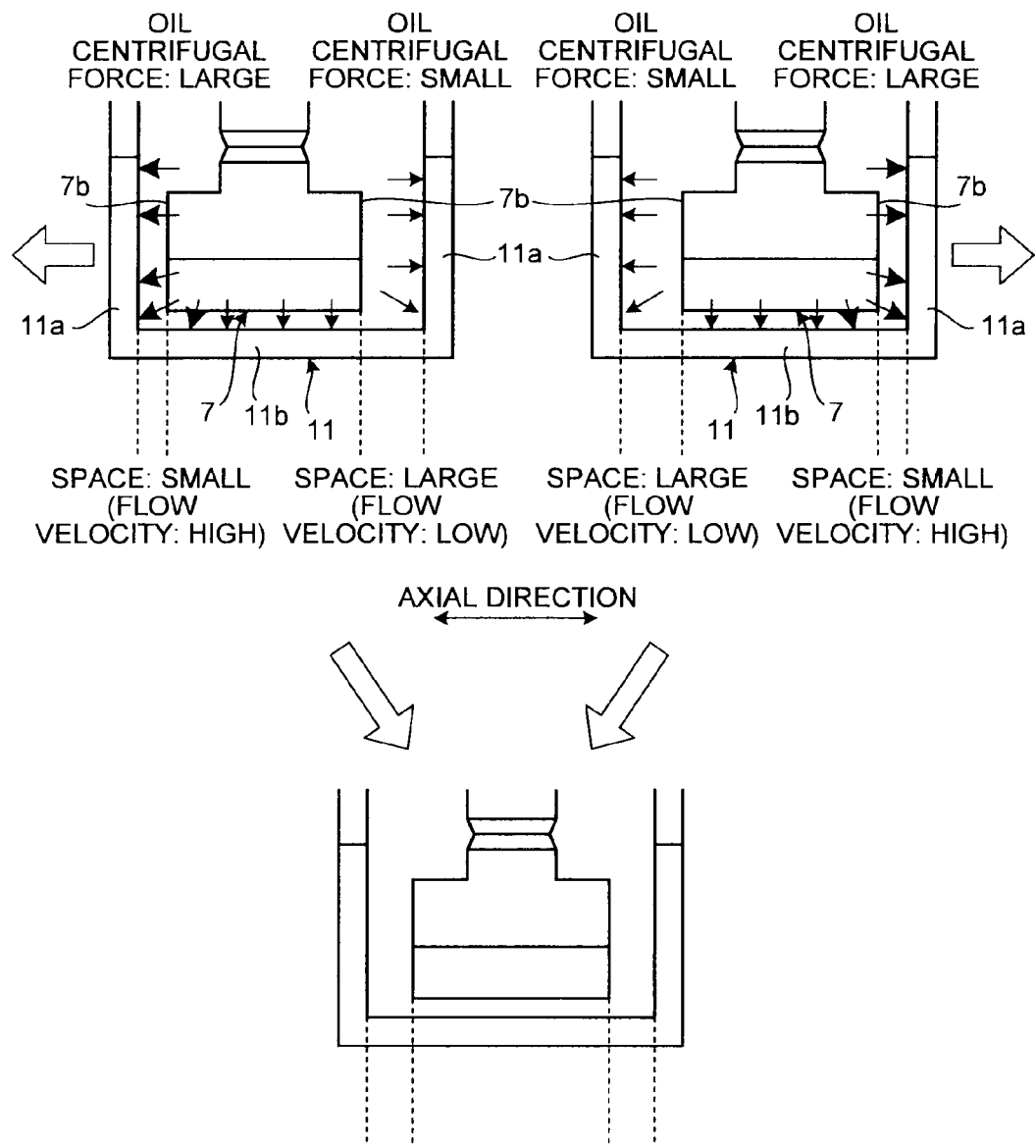
FIG. 33 is a diagram illustrating an operation of the passage member.
Figure 34:
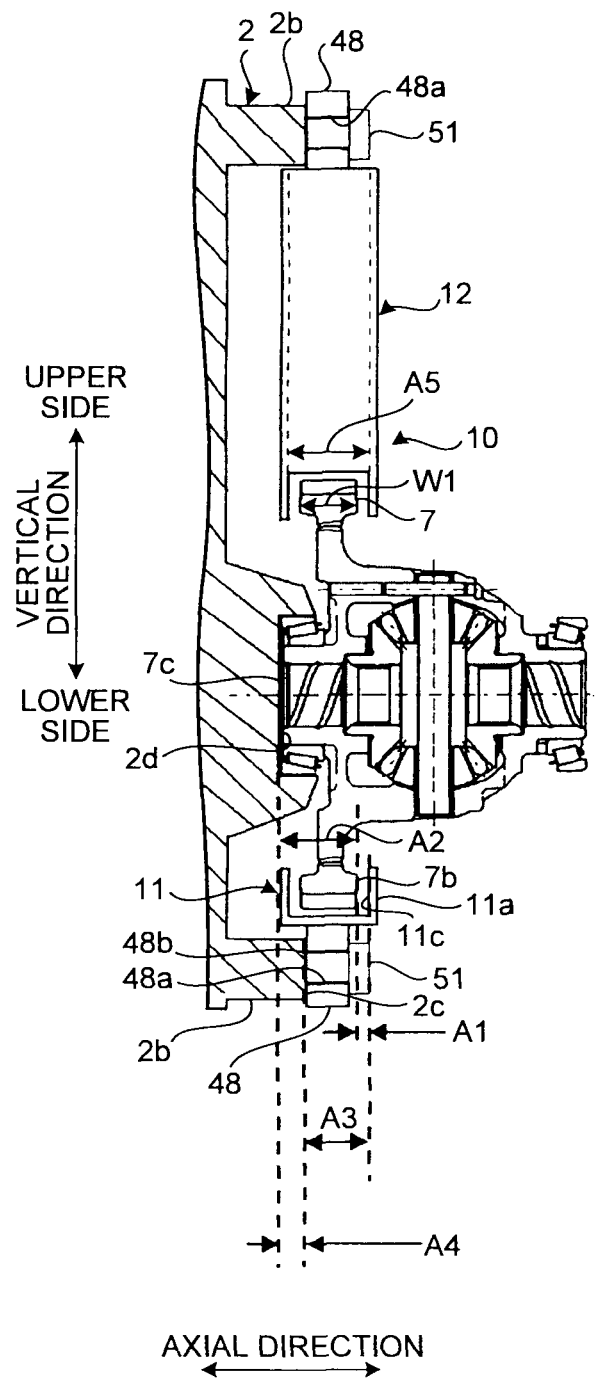
FIG. 34 is a diagram illustrating an example of a method of fixing the passage member.

With reference to FIGS. 32 to 34, an eighteenth embodiment will be described. In the eighteenth embodiment, the same reference numerals are designated to members having functions similar to those described in the foregoing embodiments and repetitive description will not be given. FIG. 32 is a diagram illustrating a method of supporting a passage member according to the eighteenth embodiment. FIG. 33 is a diagram illustrating the operation of the passage member according to the embodiment. FIG. 34 is a diagram illustrating an example of a method of fixing the passage member.

In the method of supporting the passage member of the embodiment, the passage member 10 is slidably supported in the axial direction by the support shaft. That is, the passage member 10 is supported movably relative to the differential ring gear 7 in the axial direction. By self-aligning action by hydraulic pressure, the space in the axial direction between the passage member 10 and the differential ring gear 7 is adjusted, and the position of the passage member 10 is balanced in the axial direction. Therefore, as compared with the case where the passage member 10 is fixed to the case 2 and cannot move relative to the differential ring gear 7, the margin created in the space in the axial direction between the passage member 10 an the differential ring gear 7 can be reduced. Consequently, leakage of the lubricant oil from the side of the differential ring gear 7 can be reduced.

As shown in FIG. 32, in a lubricant oil supplying apparatus 1-18 of the embodiment, the passage member 10 is supported movably in the axial direction. An attachment part 48 is provided for the outer peripheral face of the passage member 10. In the attachment part 48, through holes 48*a* penetrating the attachment part 48 in the axial direction are formed. In the case 2, support shafts 49 extending in the axial direction are disposed. Both ends of the support shaft 49 are fixed to the inner wall face of the case 2 in a state where they are inserted in the through holes 48*a*. The passage member 10 has a plurality of attachment parts 48, and each of the attachment parts 48 is supported by the support shafts 49. The inside diameter of the through hole 48*a* is set to be larger than the outside diameter of the support shaft 49. The passage member 10 is slidable along the support shafts 49, so that it can move in the axial direction relative to the differential ring gear 7. The support shaft 49 is provided with stoppers 50 regulating the movement in the axial direction of the passage member 10 in a predetermined range.

By supporting the passage member 10 so as to be axially movable relative to the differential ring gear 7, the passage member 10 can maintain a proper space to the side face of the differential ring gear 7 by the hydraulic pressure of the first passage 13. When the size of the space between the side wall 11*a* of the passage member 10 and a side face 7*b* of the differential ring gear 7 in one of axial directions and that in the other axial direction are largely different from each other as shown in FIG. 33, the flow velocity of the lubricating oil on the side of a small space is higher than that on the side of a large space. As a result, the hydraulic pressure of the lubricant oil becomes higher due to the centrifugal force on the side of the small space more than that on the side of the large space more and, as a whole, the force in the direction of increasing the space on the small space side acts on the first component part 11. When the space in one of the axial directions decreases, the force in the direction of cancelling it acts on the first component part 11, the passage member 10 moves so that the differential ring gear 7 is always positioned in the center between the pair of the side walls 11*a*.

In the method of supporting the passage member 10 in the lubricant oil supplying apparatus 1-18 of the embodiment, by providing the self-aligning mechanism using the centrifugal hydraulic pressure, as described below with reference to FIG. 34, the space between the side face 7*b* of the differential ring gear 7 and the side wall 11*a* can be set to small one in consideration of variations. Consequently, the feed-up performance by the differential ring gear 7 can be maximized.

FIG. 34 shows a fixing method using a bolt as an example of the method of fixing the passage member 10. The passage member 10 has the attachment part 48 having the through hole 48*a* and is fixed to the case 2 by a bolt 51 which is inserted in the through hole 48*a* and screwed in a boss 2*b* in the case 2. In the case where the passage member 10 is directly fixed to the case 2, to consider many variations to assure a clearance between the passage member 10 and the side face 7*b* of the differential ring gear 7, a large space has to be set as a nominal value, and leakage of the lubricant oil becomes large. Variations of the clearance (hereinbelow, written as "side-face clearance") A1 between the side face 7*b* of the differential ring gear 7 and the side wall 11*a* are equal to a total of variations of the following three distances.
(1) distance A2 in the axial direction between a bearing face 7*c* and the side face 7*b* in the differential ring gear 7
(2) distance A3 in the axial direction between a boss contact face 48*b* of the attachment part 48 and the inner side face 11*c* of the side wall 11*a*
(3) distance A4 in the axial direction between a boss face 2*c* in the case 2 and a bearing contact face 2*d*.

On the other hand, in the method of supporting the passage member 10 in the lubricant oil supplying apparatus 1-18 of the embodiment, variations of the side-face clearance A1 are equal to a total of variations of the following two distances.
(4) tooth width W1 of the differential ring gear 7
(5) space A5 in the axial direction of the pair of side walls 11*a*

In this case, the side-face clearance A1 may be, for example, about one third of the side-face clearance A1 in the case of fixing using the bolt 51. Therefore, leakage of the lubricant oil between the side face 7*b* of the differential ring gear 7 and the side wall 11*a* is suppressed, and the efficiency of feeding the lubricant oil to the oil receiving part 8 by the rotation of the differential ring gear 7 can be improved. For example, the lubricant oil can be fed to the oil receiving part 8 at lower vehicle speed, or the lubricant oil can be raised to an upper level in the case 2.

Figure 35:
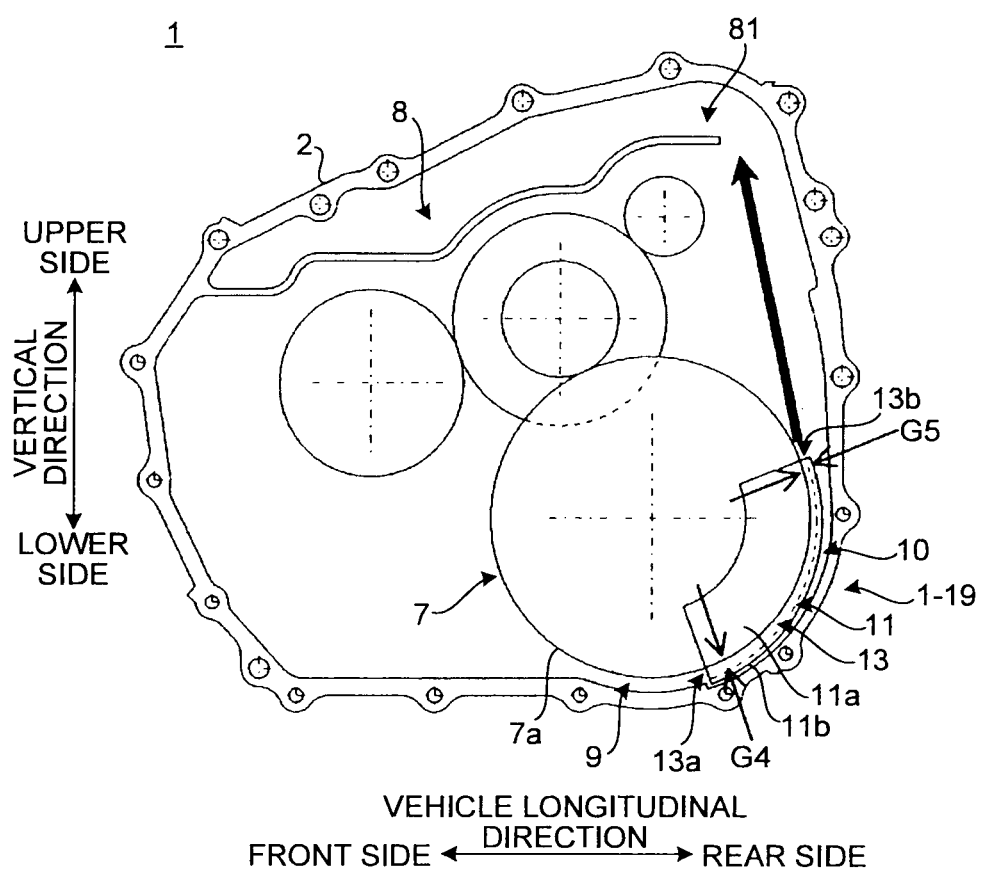
FIG. 35 is a diagram illustrating a configuration example of the lubricant oil supplying apparatus.

The lubricant oil supplying apparatus may be constructed, for example, as shown in FIG. 35. FIG. 35 is a diagram illustrating a configuration example of a lubricant oil supplying apparatus. In a lubricant oil supplying apparatus 1-19 shown in FIG. 35, the passage member 10 is not provided with a second component part, and the lubricant oil is fed to the oil receiving part 8 via the first passage 13. The first component part 11 has: the pair of side walls 11*a* opposed to each other while sandwiching the differential ring gear 7 in the axial direction; and the curved part 11*b* opposed to the outer peripheral face 7*a* of the differential ring gear 7 in the radial direction and formed in a shape corresponding to the outer peripheral face 7*a*. The first passage 13 is formed between the first component part 11 and the differential ring gear 7. The outflow port 13*b* of the first passage 13 faces the inflow port 81 of the oil receiving part 8. A clearance G4 in the radial direction between the differential ring gear 7 and the first component part 11 on the upstream side of the first passage 13 is larger than a clearance G5 in the radial direction between the differential ring gear 7 and the first component part 11 on the downstream side of the first passage 13. Consequently, the flow velocity of the lubricant oil on the downstream side of the first passage 13 becomes higher than that of the lubricant oil on the upstream side. Therefore, as compared with the case where the clearance in the radial direction between the differential ring gear 7 and the first component part 11 does not change along the flow direction of the first passage 13, the lubricant oil which flows out from the outflow port 13b rises higher in the case 2. As a result, the performance of feeding the lubricant oil upward in the vertical direction in the lubricant oil supplying apparatus 1-19 can be improved.

The foregoing embodiments can be properly combined and executed.

INDUSTRIAL APPLICABILITY

As described above, the lubricant oil supplying apparatus according to the present invention is useful to supply the lubricant oil to the oil receiving part by the rotation of the rotating member and, particularly, suitable to improve the performance of feeding the lubricant oil upward in the vertical direction.

REFERENCE SINS LIST

1 POWER TRANSMISSION APPARATUS
1-1, 1-2, 1-3, 1-4, 1-5, 1-6, 1-7, 1-8, 1-9, 1-10, 1-11, 1-12, 1-13, 1-14, 1-15, 1-16, 1-17, 1-18, 1-19 Lubricant Oil Supplying Apparatus
2 CASE
7 DIFFERENTIAL RING GEAR
8 OIL RECEIVING PART
9 ACCUMULATING PART
10 PASSAGE MEMBER
11, 15, 16 FIRST COMPONENT PART
12, 30, 42 SECOND COMPONENT PART
13 FIRST PASSAGE
13b OUTFLOW PORT
13c CONNECTION PART
14 SECOND PASSAGE
39 THIRD PASSAGE
40, 41 ENGAGEMENT PART

The invention claimed is:

1. A lubricant oil supplying apparatus provided for a power transmission apparatus having a storage part that stores lubricant oil, a rotating member connected to a drive wheel of a vehicle and feeding the lubricant oil in the storage part by rotating interlockingly with rotation of the drive wheel, and an oil receiving part, in which the lubricant oil is supplied from the oil receiving part to a part to be lubricated, and supplying the lubricant oil to the oil receiving part, the lubricant oil supplying apparatus comprising:
  a passage member that guides the lubricant oil fed by the rotating member to the oil receiving part, wherein
  the oil receiving part is disposed above the rotating member in the vertical direction,
  the passage member includes
  a first component part that is provided so as to be opposed to the rotating member along a circumferential direction of the rotating member and forms, between the rotating member and itself, a first passage in which the lubricating oil fed by the rotating member flows, and
  a second component part that forms a second passage for guiding the lubricant oil in the first passage to the oil receiving part, the first component part includes a side wall opposed to a side face of the rotating member and a curved part opposed to an outer peripheral face of the rotating member, the second passage is connected to the first passage via an opening formed in the curved part, and the opening is disposed on an upstream side in a flow direction of an outflow port formed on a downstream side in a flow direction of the lubricant oil along a rotation direction of the rotating member in the first passage, and the lubricant oil supplying apparatus further comprises a suppression structure that suppresses flow of the lubricant oil in the first passage from the opening toward the outflow port and promotes flow of the lubricant oil toward the second passage.

2. The lubricant oil supplying apparatus according to claim 1, wherein, as the suppression mechanism, a gap between the rotating member and the first component part on the downstream side in the flow direction of the opening is smaller than a gap between the rotating member and the first component part on the upstream side in the flow direction of the opening.

3. The lubricating oil supplying apparatus according to claim 2, wherein the opening is formed in a position opposed to an outer peripheral face of the rotating member,
  a step is formed in a position corresponding to the opening, in a wall face opposed to the side face of the rotating member in the side wall, a gap between the side face of the rotating member and the wall face on the downstream side in the flow direction of the step is smaller than a gap between the side face of the rotating member and the wall face on the upstream side in the flow direction of the step, and
  the step extends in a direction of guiding the lubricant oil flowing along the wall face to the opening.

4. The lubricant oil supplying apparatus according to claim 1, wherein the opening is formed in a position opposed to an outer peripheral face of the rotating member, and
  in the second passage, the oil receiving part side is positioned on a downstream side in the flow direction of an opening side.

5. The lubricant oil supplying apparatus according to claim 1 or 2, wherein the second component part has a cylindrical shape in which the second passage is formed.

6. The lubricant oil supplying apparatus according to claim 5, wherein the opening is formed in a position opposed to an outer peripheral face of the rotating member, and
  a width of the second passage in the axial direction of the rotating member is similar to a width of an outer peripheral face of the rotating member in an axial direction of the rotating member.

7. The lubricant oil supplying apparatus according to claim 5, wherein the opening is formed in a position opposed to an outer peripheral face of the rotating member,
  the rotating member is a helical gear, and
  the second passage is inclined to a side on which a tooth face on a front side in the rotational direction of the rotating member in an axial direction of the rotating member is directed from the opening toward the oil receiving part.

8. The lubricant oil supplying apparatus according to claim 5, wherein the opening is formed in a position opposed to an outer peripheral face of the rotating member,
  the second component part has inner wall faces opposed to each other in the axial direction of the rotating member while sandwiching the second passage, and in the inner wall face to which a tooth face on a rear side in the rotational direction of the rotating member is directed, as one of the inner wall faces opposed to each other, a projection which projects toward the other inner wall face is formed.

9. The lubricant oil supplying apparatus according to claim 5, wherein the opening is formed in a position opposed to an outer peripheral face of the rotating member, and
a rectifying member is disposed in the second passage.

10. The lubricating oil supplying apparatus according to claim 5, wherein a passage sectional area on the oil receiving part side in the second passage is smaller than a passage sectional area on an opening side.

11. The lubricant oil supplying apparatus according to claim 5, comprising a backward flow suppression structure that allows movement of the lubricating oil from an opening side in the second passage toward the oil receiving part side and suppresses movement of the lubricating oil from the oil receiving part side toward the opening side.

12. The lubricant oil supplying apparatus according to claim 5, wherein the second passage has at least a passage for low speed in which the lubricating oil flows toward the oil receiving part in the case where rotation speed of the
rotating member is low, and a passage for high speed having a passage sectional area larger than that of the passage for low speed and to which the lubricant oil flows toward the oil receiving part in the case where the rotational speed of the rotating member is high.

13. The lubricating oil supplying apparatus according to claim 1, wherein a third passage in which the lubricant oil can circulate is formed between an inner peripheral face of a case of the power transmission apparatus and the passage member, on the outside in the radial direction of the rotating member of the first and second passages, and
in the case where rotational speed of the rotating member is high, the lubricant oil apart from the rotating member passes through the third passage and moves toward the oil receiving part.

14. The lubricant oil supplying apparatus according to claim 1 or 2, wherein the rotating member engages with a predetermined rotating member as another rotating member, and
as the suppression structure, the outflow port is connected to an engagement part between the rotating member and the predetermined rotating member via an oil passage formed by the passage member.

15. The lubricant oil supplying apparatus according to claim 1, comprising at least one of a mechanism of allowing the lubricant oil in the first passage escape to the outside in accordance with pressure in the first passage and a mechanism of allowing the lubricant oil in the second passage escape to the outside in accordance with pressure in the second passage.

16. The lubricant oil supplying apparatus according to claim 1, comprising an outflow port guiding member that guides the lubricant oil which flows from the outflow port to the storage part.

17. The lubricant oil supplying apparatus according to claim 1, wherein the first component part is opposed to the outer peripheral face and both side faces of the rotating member.

18. The lubricant oil supplying apparatus according to claim 17, wherein the passage member is supported relatively movably in the axial direction to the rotating member.

19. A lubricant oil supplying apparatus comprising:
a storage part that stores lubricant oil;
a rotating member that is connected to a drive wheel of a vehicle and rotates interlockingly with rotation of the drive wheel to feed the lubricant oil in the storage part;
an oil receiving part that is disposed above the rotating member in the vertical direction and supplies the lubricant oil to a member to be lubricated; and
a passage member, wherein
the passage member is provided so as to be opposed to the rotating member along a circumferential direction of the rotating member and forms, between the rotating member and itself, a first passage in which the lubricant oil fed by the rotating member flows,
the passage member includes a side wall opposed to a side face of the rotating member and a curved part opposed to an outer peripheral face of the rotating member
in the first passage, a first part in which a gap between the rotating member and the passage member is smaller than a second part in a flow direction of the lubricant oil along the rotation direction of the rotating member in the first passage exists, and
a second passage guiding the lubricant oil in the first passage to the oil receiving part is connected to the first passage via an opening formed in the curved part, and
the opening is disposed on an upstream side of the first part in a flow direction.

\* \* \* \* \*